(12) United States Patent
Ko et al.

(10) Patent No.: US 11,188,093 B2
(45) Date of Patent: Nov. 30, 2021

(54) METHOD OF RECEIVING MAP AND SERVER APPARATUS THEREFOR

(71) Applicant: SAMSUNG ELECTRONICS CO., LTD., Suwon-si (KR)

(72) Inventors: Seungchul Ko, Suwon-si (KR); Seungsoo Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 16/255,072

(22) Filed: Jan. 23, 2019

(65) Prior Publication Data
US 2019/0227567 A1 Jul. 25, 2019

(30) Foreign Application Priority Data
Jan. 23, 2018 (KR) .................. 10-2018-0008407

(51) Int. Cl.
| | | |
|---|---|---|
| *G05D 1/02* | (2020.01) | |
| *G06F 16/29* | (2019.01) | |
| *G05D 1/00* | (2006.01) | |
| *G06F 9/451* | (2018.01) | |
| *G06F 16/9537* | (2019.01) | |

(52) U.S. Cl.
CPC .......... *G05D 1/0276* (2013.01); *G06F 16/29* (2019.01); *G06F 16/9537* (2019.01); *G05D 1/0061* (2013.01); *G06F 9/451* (2018.02)

(58) Field of Classification Search
CPC .. G05D 1/0276; G05D 1/0274; G05D 1/0285; G05D 1/0287; G05D 1/0044; G05D 1/0061; G05D 1/00; G05D 1/0088; G08G 1/00; G08G 1/16; G06F 16/9537; G06F 16/84; G06F 16/29; G06F 11/0736; G06F 11/0739; G06F 9/451; B64C 2201/141; B60G 2800/964; B60W 2556/50; G01S 5/145; G01C 21/00
See application file for complete search history.

(56) References Cited

U.S. PATENT DOCUMENTS

| | | | |
|---|---|---|---|
| 6,704,649 B2* | 3/2004 | Miyahara ............... | G01C 21/32 340/990 |
| 9,460,616 B1* | 10/2016 | Miyahira ............. | G08G 1/0112 |
| 9,761,137 B2* | 9/2017 | Beaurepaire ..... | G08G 1/096811 |
| 10,133,280 B2* | 11/2018 | Kim ...................... | G08G 1/0141 |
| 10,339,810 B2* | 7/2019 | Akiyama .......... | B60W 30/0953 |

(Continued)

FOREIGN PATENT DOCUMENTS

| EP | 1330803 B1 | 12/2010 |
|---|---|---|
| KR | 10-2018-0000672 A | 1/2018 |

OTHER PUBLICATIONS

International Search Report (PCT/ISA/210) and Written Opinion (PCT/ISA/237) dated Apr. 30, 2019 issued by the International Searching Authority in International Application No. PCT/KR2019/000974.

(Continued)

*Primary Examiner* — Ig T An
(74) *Attorney, Agent, or Firm* — Sughrue Mion, PLLC

(57) ABSTRACT

A server method of receiving a precise digital map for navigation or autonomous driving as a plurality of partial precise digital maps corresponding to servers respectively proximate to portions of a navigation path.

20 Claims, 20 Drawing Sheets

(56) References Cited

U.S. PATENT DOCUMENTS

| | | | |
|---|---|---|---|
| 2005/0085996 A1* | 4/2005 | Park | G01C 21/32 |
| | | | 701/409 |
| 2011/0125344 A1 | 5/2011 | An et al. | |
| 2013/0275371 A1* | 10/2013 | Chang | G06F 16/23 |
| | | | 707/609 |
| 2015/0066366 A1* | 3/2015 | Pang | G06Q 20/14 |
| | | | 701/532 |
| 2016/0138926 A1* | 5/2016 | Annapureddy | G01C 21/3688 |
| | | | 701/467 |
| 2016/0327404 A1* | 11/2016 | Israelsson | H04W 4/40 |
| 2016/0371975 A1* | 12/2016 | Yamamoto | G08G 1/096716 |
| 2017/0019349 A1* | 1/2017 | Israelsson | G01C 21/26 |
| 2017/0116477 A1* | 4/2017 | Chen | G06K 9/00651 |
| 2017/0148350 A1* | 5/2017 | Stankoulov | B60W 50/14 |
| 2018/0188039 A1* | 7/2018 | Chen | B60W 40/06 |
| 2018/0267536 A1* | 9/2018 | Goldberg | G05D 1/0088 |
| 2020/0255026 A1* | 8/2020 | Katardjiev | G08G 1/096725 |
| 2020/0256681 A1* | 8/2020 | Kim | B60R 16/023 |

OTHER PUBLICATIONS

Communication dated Feb. 4, 2021 by the European Patent Office in European Application No. 19743876.5.

* cited by examiner

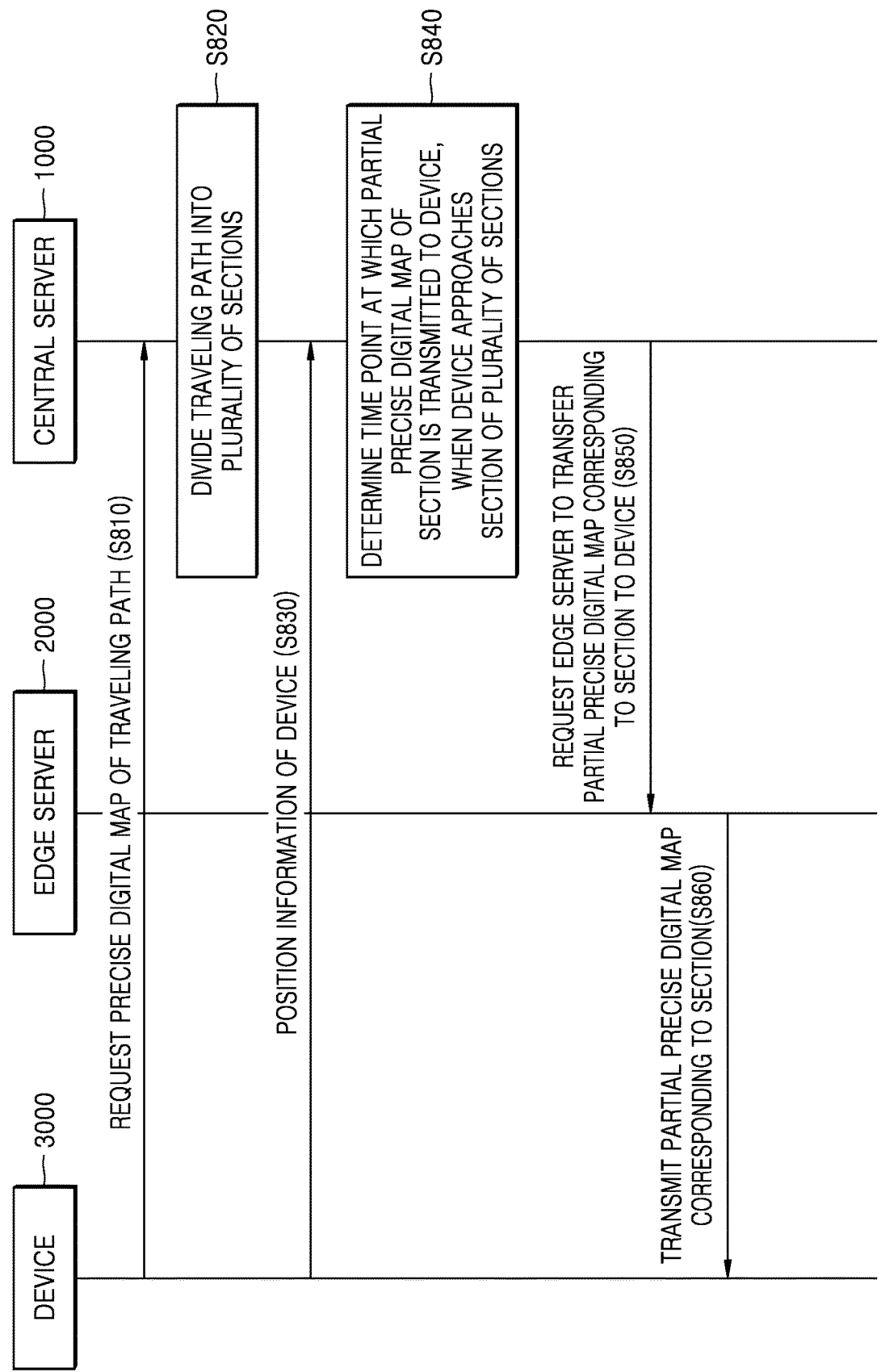

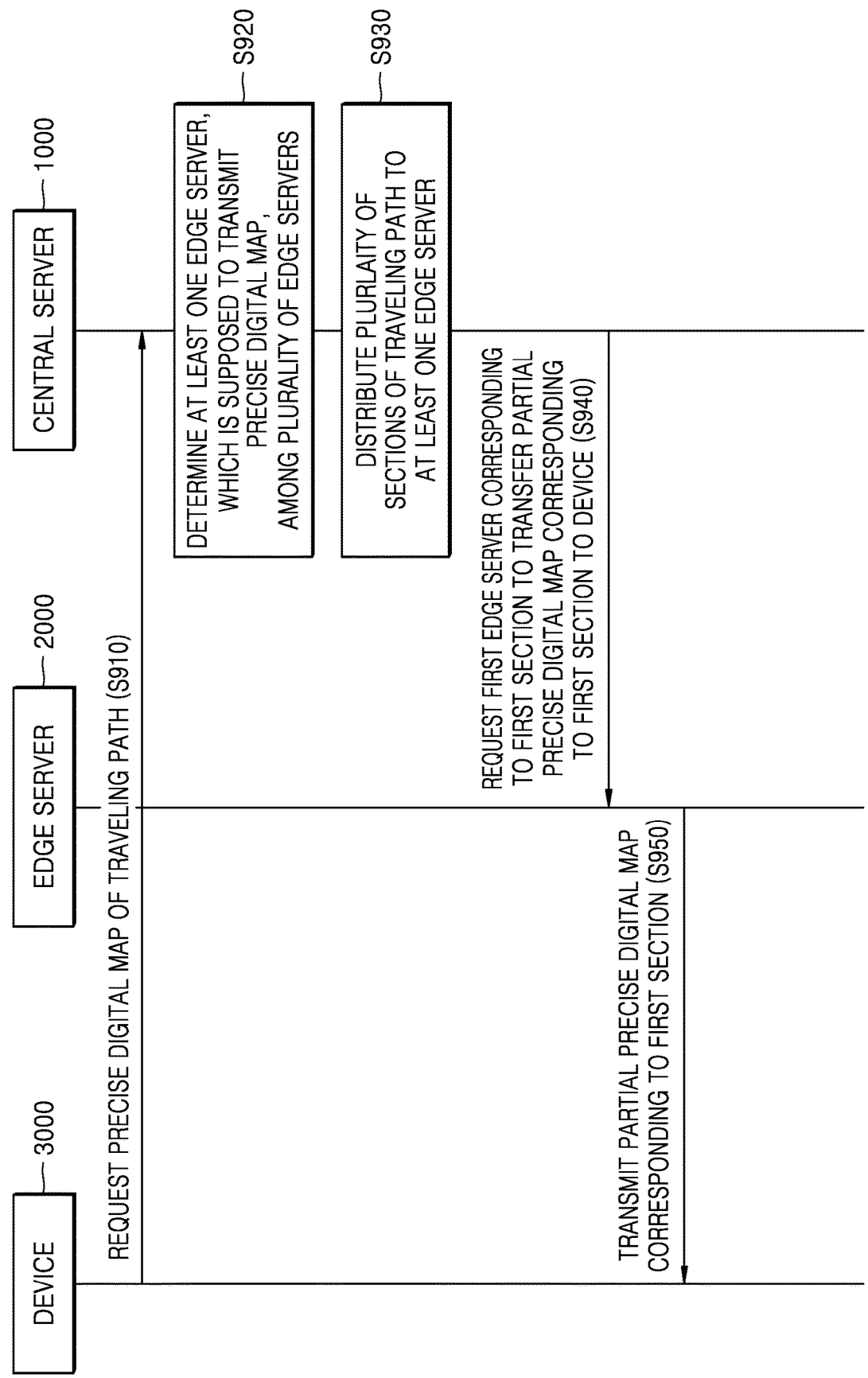

METHOD OF RECEIVING MAP AND SERVER APPARATUS THEREFOR

CROSS-REFERENCE TO RELATED APPLICATION(S)

This application is based on and claims priority under 35 U.S.C. § 119 to Korean Patent Application No. 10-2018-0008407, filed on Jan. 23, 2018, in the Korean Intellectual Property Office, the disclosure of which is herein incorporated by reference in its entirety.

BACKGROUND

1. Field

The disclosure relates to a method of receiving a precise digital map for navigation or autonomous driving and a server apparatus therefor.

2. Description of Related Art

An autonomous vehicle refers to a vehicle autonomously traveling to a given destination, whereby the vehicle is controlled through recognition of a surrounding environment and traveling without human intervention of a driver or passenger of the autonomous vehicle.

To completely implement autonomous driving, the autonomous vehicle should be capable of accurately recognizing a surrounding environment in which the autonomous vehicle travels. To this end, the autonomous vehicle determines various aspects of a surrounding environment, such as proximate geographical features and planimetric features, by using sensors such as a camera and a radio detection and ranging (RADAR) unit. However, an analysis of the surrounding environment determined by using only data derived from the sensors may be inaccurate.

Therefore, a precise digital map is required for full autonomous driving, so that the autonomous vehicle may more precisely recognize, and thus more safely and efficiently travel through, a surrounding environment by using the digital map together with information acquired by the sensors.

SUMMARY

Methods and apparatuses of the disclosure relate to a precise digital for use in an autonomous vehicle to more safely and efficiently travel through a surrounding environment.

Additional aspects will be set forth in part in the description which follows and, in part, will be apparent from the description, or may be learned by practice of the presented embodiments.

In accordance with an aspect of the disclosure, there is provided a server including: a receiver configured to receive a request for a precise digital map of a traveling path from a vehicle; a processor configured to divide the traveling path into a plurality of sections and determine at least one edge server respectively corresponding to the plurality of sections among a plurality of edge servers; and a transmitter configured to request a first edge server corresponding to a first section of the plurality of sections among the at least one edge server to transfer a partial precise digital map corresponding to the first section to the vehicle, when the vehicle approaches the first section.

The processor may be further configured to determine edge servers adjacent to the traveling path among the plurality of edge servers as the at least one edge server and divide the traveling path into the plurality of sections based on a position of the determined at least one edge server.

The plurality of edge servers may store precise digital maps of regions corresponding to the plurality of edge servers, respectively, and the processor may be further configured to divide the traveling path into the plurality of sections and determine at least one edge server to which the precise digital map is to be transmitted among the plurality of edge servers, based on positions of the regions respectively corresponding to the plurality of edge servers.

The edge server may be a base station configured to relay mobile communication, and the regions respectively corresponding to the plurality of edge servers may include at least one of a coverage area of the base station and coverage areas of other base stations adjacent to the base station.

The processor may be further configured to request the first edge server to transfer the partial precise digital map corresponding to the first section to the vehicle, when the vehicle approaches within a previously determined distance from a starting position of the first section.

The processor may be further configured to request the first edge server to transfer the partial precise digital map corresponding to the first section to the vehicle, when an expected traveling time to a starting position of the first section is within a previously determined time.

The processor may be further configured to request the first edge server to transfer the partial precise digital map corresponding to the first section to the vehicle, by transmitting identification information of the vehicle to the first edge server corresponding to the first section.

The processor may be further configured to request the vehicle to receive the partial precise digital map corresponding to the first section from the first edge server corresponding to the first section, by transmitting access information of the first edge server corresponding to the first section to the vehicle.

The precise digital map may be formed of a plurality of layers respectively including pieces of information on different objects, and the processor may be further configured to request the first edge server to transfer a first layer of the plurality of layers to the vehicle, upon receiving a request for the first layer of the plurality of layers from the vehicle.

The server may further include a storage configured to store a time that the precise digital map is updated, the receiver may be further configured to receive a creation time of a precise digital map stored in the vehicle from the vehicle, and the processor may be further configured to transmit only layers of which the creation time of the precise digital map stored in the vehicle is earlier than the updated time.

In accordance with a second aspect of the disclosure, a vehicle includes: a user input interface configured to receive a user input for requesting autonomous driving of the vehicle; a transmitter configured to request a precise digital map of a traveling path of the vehicle from a central server upon receiving the user input for requesting autonomous driving of the vehicle; a receiver configured to receive, from the central server, access information of an edge server from which a partial precise digital map of a partial section of the traveling path is to be received and receive the partial precise digital map of the partial section of the traveling path from the edge server based on the access information of the edge server; and a processor configured to perform the autonomous driving of the vehicle based on the partial precise digital map of the partial section of the traveling path.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B illustrate a time point at which the device receives a partial precise digital map of a section from the central server, according to an embodiment;

FIGS. 9A and 9B illustrate a method of receiving, by the device, a partial precise digital map from an edge server, according to an embodiment;

DETAILED DESCRIPTION

Figure 1:
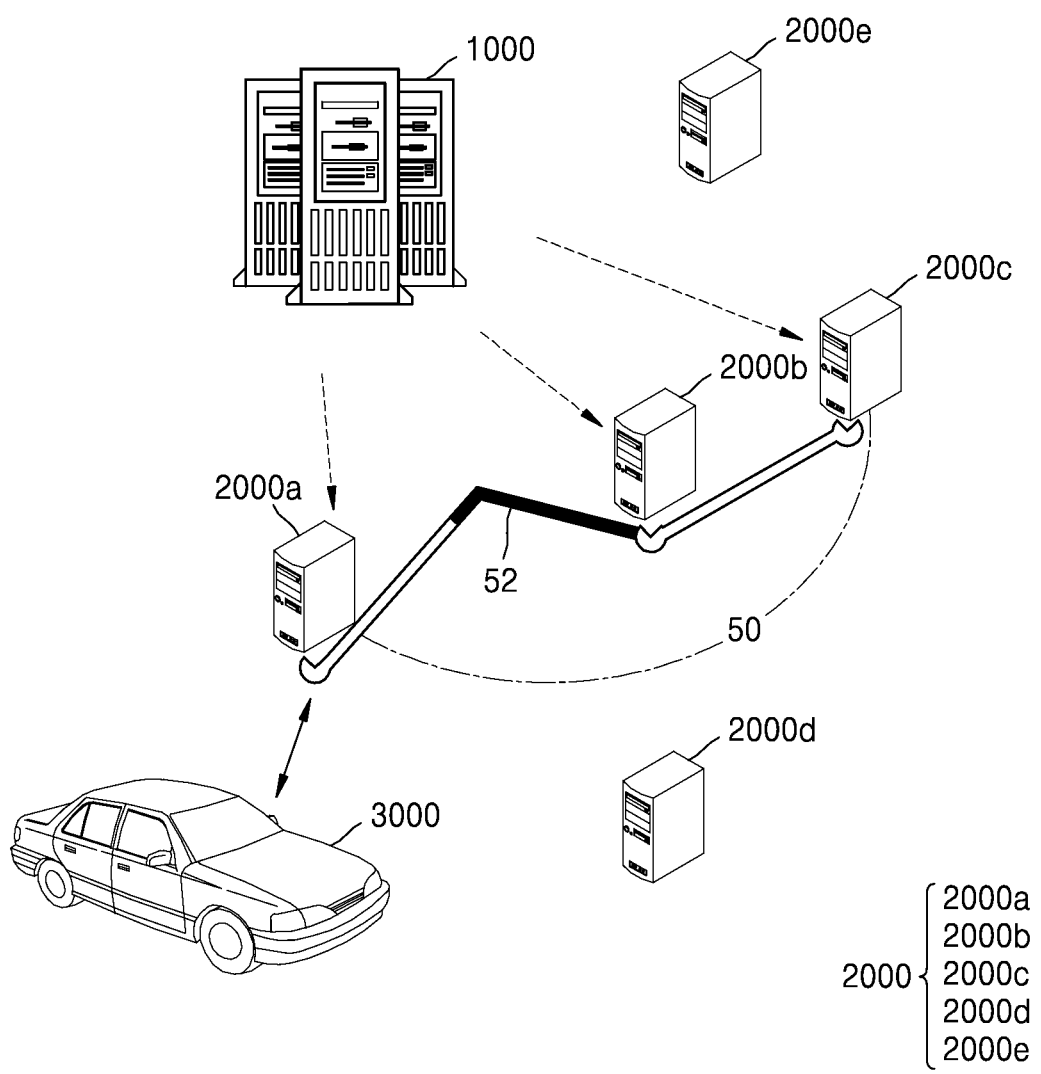
FIG. 1 illustrates a method, performed by a central server, of transmitting a precise digital map to a device, according to an embodiment.

The terms used in the specification will be schematically described, and then, the disclosure will be described in detail.

The terminology used in the disclosure is used only to describe specific embodiments and does not have any intention to limit the disclosure. The terms used in disclosure are those general terms currently widely used in the art, but the terms may vary according to the intention of those of ordinary skill in the art, precedents, or new technology in the art. Also, specified terms may be selected, and in this case, the detailed meaning thereof will be described in the detailed description. Thus, the terms used in the specification should be understood not as simple names but based on the meaning of the terms and the overall description.

Throughout the specification, it will be understood that when a component "includes" an element, unless there is another opposite description thereto, it should be understood that the component does not exclude another element but may further include another element. In addition, terms such as " . . . unit," " . . . module," or the like refer to units that perform at least one function or operation, and the units may be implemented as hardware or software or as a combination of hardware and software.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects thereof. As used herein, the term "and/or" includes any and all combinations of one or more of the associated listed items. Expressions such as "at least one of," when preceding a list of elements, modify the entire list of elements and do not modify the individual elements of the list. For example, the expressions "at least one of a, b, and c," "at least one of a, b, or c," and "at least one of a, b, and/or c" should be understood as including only a, only b, only c, both a and b, both a and c, both b and c, and all of a, b, and c.

FIG. 1 illustrates a method, performed by a central server 1000, of transmitting a precise digital map to a device 3000, according to an embodiment.

Referring to FIG. 1, the central server 1000 may receive a request for a precise digital map of a traveling path 50 from the device 3000 and transmit the precise digital map to the device 3000 via at least one edge server 2000a to 2000c. In addition, the central server 1000 may control the at least one edge server 2000a to 2000c such that the at least one edge server 2000a to 2000c transmits the precise digital map to the device 3000.

For example, the central server 1000 may determine, among a plurality of (first to fifth) edge servers 2000a to 2000e, the at least one edge server 2000a to 2000c to transmit the precise digital map to the device 3000 and distribute a plurality of sections of the traveling path 50 to the at least one edge server 2000a to 2000c. Accordingly, when the device 3000 physically approaches a first section 52 among the plurality of sections on the traveling path 50, the central server 1000 may request the first edge server 2000a corresponding to the first section 52 to transfer a partial precise digital map corresponding to the first section 52.

According to an embodiment, the central server 1000 may directly create the precise digital map. Alternatively, the central server 1000 may receive the precise digital map from an external device. Alternatively, the central server 1000 may store the precise digital map, or according to an embodiment, store only information on an external server in which the precise digital map is stored and transfer only link information (e.g., universal resource locator, uniform resource identifier, etc.) of the precise digital map to an edge server.

In addition, the central server 1000 may be a core server or a cloud server.

The plurality of edge servers 2000a to 2000e may transmit the precise digital map and/or a respective portion of the precise digital map corresponding to a section 52 on the traveling path 50 to the device 3000 under control of the central server 1000. The plurality of edge servers 2000a to 2000e may be geographically dispersed in wide area. The plurality of edge servers 2000*a* to 2000*e* may be controlled by the central server 1000 by means of wired/wireless communication and may wirelessly communicate with the device 3000 over one or more networks. The plurality of edge servers 2000*a* to 2000*e* may be respectively assigned to mobile communication base stations of one or more wireless networks and may be general servers. In addition, the plurality of edge servers 2000*a* to 2000*e* may be roadside base stations configured to communicate with a vehicle over a middle or short distance wireless communication.

The device 3000 may provide a navigation function. For example, the device 3000 may be a navigation device mounted on a vehicle or may be software and/or hardware integrated within a general vehicle or an autonomous vehicle. Alternatively, the device 3000 may be a smartphone, carried within a vehicle, configured to provide the navigation function. When the device 3000 is an autonomous vehicle, the device 3000 may include a positioning sensor for determining a geographic position of the vehicle or a relative position of the vehicle with respect to other known and generally stationary objects such as buildings and roads, and the positioning sensor may include a global positioning system (GPS), a radio detection and ranging (RADAR) system, and an ultrasonic sensor. The device 3000 may autonomously drive by using the positioning sensor and the precise digital map.

The device 3000 may communicate with the central server 1000 in a wired/wireless manner. In addition, the device 3000 may communicate with the plurality of edge servers 2000*a* to 2000*e* in a mobile communication scheme and may communicate with a road-side base station or another device 3000 in a communication scheme selected from dedicated short range communication (DSRC), wireless access vehicular environment (WAVE) (802.11p), or wireless local area network (WLAN) (802.11a), or the like.

According to an embodiment, the precise digital map may refer to a high-precision digital map or a real-time, live map.

Because the precise digital map has a much larger data size than a common electronic map, it is difficult for the device 3000 to receive all data of a total traveling path in the form of the precise digital map, and a transmission time may be long due to network and transmission variables. In addition, because the precise digital map includes real-time data, it may be difficult or undesirable that the device 3000 receives and stores a precise digital map of the total traveling path and other traveling paths related or proximate to the total traveling path in advance. In addition, when a server in which the precise digital map is stored is located far away from the device 3000, a transmission time of the precise digital map may be high.

Therefore, the central server 1000 may divide or segment the traveling path 50 into a plurality of sections and transmit a partial precise digital map corresponding to each of the divided sections to the device 3000 by using the at least one edge server 2000*a* to 2000*c* adjacent or geographically proximate to respective portions of the traveling path 50. For example, the device 3000 may receive the partial precise digital map corresponding to the first section 52 from the first edge server 2000*a* before traveling on the first section 52 of the traveling path 50.

Figure 2:
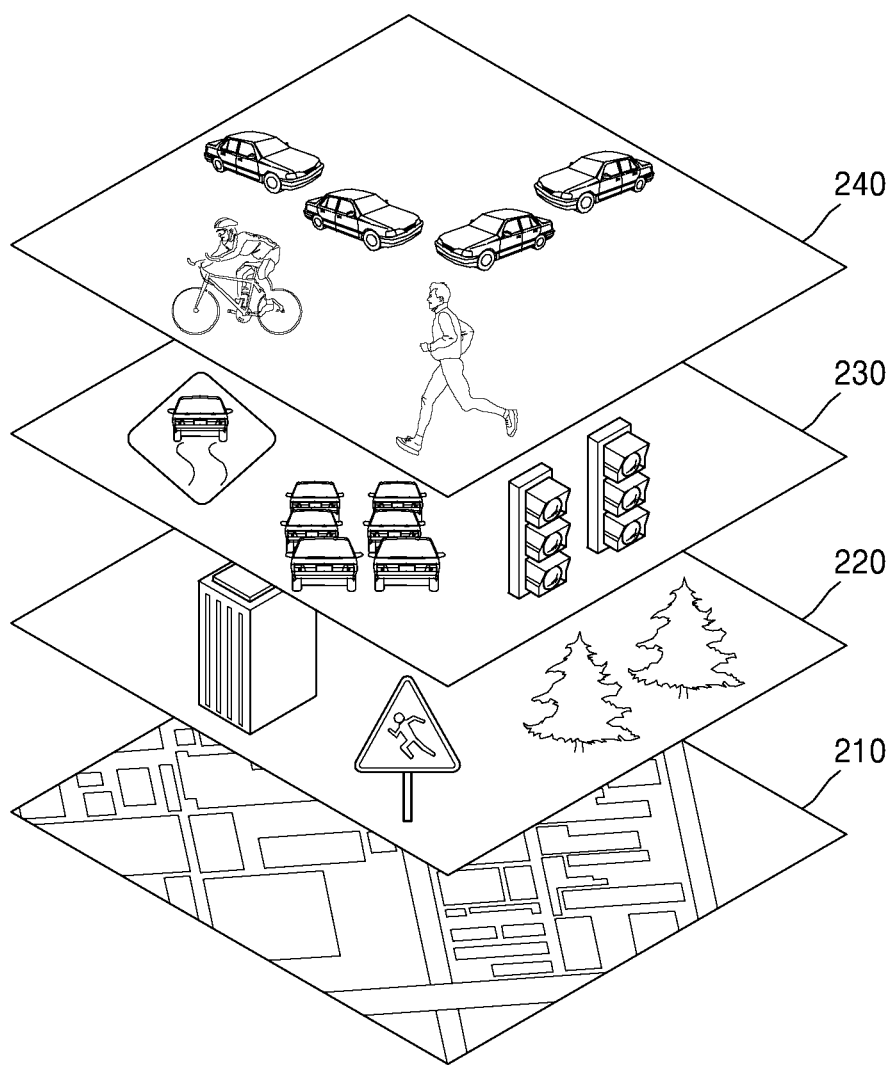
FIG. 2 illustrates a precise digital map according to an embodiment.

FIG. 2 illustrates a precise digital map according to an embodiment.

Referring to FIG. 2, the precise digital map may include various kinds of information for autonomous driving.

The precise digital map may include information on roads and surrounding geographical features and may be a map from which a geographical feature or a planimetric feature is identified within a small error range of about 10 Cm to about 20 Cm. In this regard, a level of detail of the precise digital map may be much more accurate than an existing electronic map and may three-dimensionally express the fluctuation of terrain, a radius and a curvature of a curved road, and a surrounding environment. Owing to such level of detail, a data amount necessary to express the precise digital map, and hence a transmission time and bandwidth needed to convey the precise digital map between a server and a vehicle or device, may be high.

In addition, the precise digital map may include information on not only a roadway lane but also positions of regulatory lanes such as the centerline of lanes, a boundary line of a road, a road centerline, and a stop line, information on positions of road facilities such as a median strip, a tunnel, a bridge, and an underpass, and information on positions of sign facilities such as a traffic safety sign, a road mark, and a traffic light. Accordingly, an autonomous vehicle may precisely calculate a current position of the autonomous vehicle on a road by analyzing data provided by a positioning sensor with information corresponding to the road on the precise digital map.

In addition, the precise digital map may include not only static information such as positions of geographical features, planimetric features, and regulatory lanes but also dynamic information on a real-time road status and positions of moving objects such as vehicles and human beings.

The precise digital map may include a plurality of layers, which may include information on different objects, respectively. For example, the precise digital map may be divided into a plurality of layers according to a changing period of an object. For example, a first layer 210 may include map data of roads that are objects which are hardly changed and known to have generally static positions. In addition, a second layer 220 may include position information of a landmark or traffic light that is an object that is also hardly changed, but may have a higher chance of positioning change than a road or a building. In addition, a third layer 230 may include information on a traffic status and a signal period of a signal light, which are periodically or pseudo-periodically changed objects. In addition, a fourth layer 240 may include position information of vehicles and pedestrians that are objects which are changed in real-time.

The device 3000 may receive only some layers among the first to fourth layers 210 to 240 from an edge servers 2000 (i.e., at least one of the edge servers 2000*a* to 2000*e*). For example, the device 3000 may request and receive only the fourth layer 240 of the precise digital map from the central server 1000. Alternatively, the device 3000 may request and receive only the first and second layers 210 and 220 of the precise digital map from the central server 1000.

Alternatively, the central server 1000 may receive a created time of a precise digital map of a traveling path, which is stored in the device 3000, from the device 3000 and provide, to the device 3000, only layers newly updated after the received created time among the plurality of layers.

Alternatively, the device 3000 may receive a user input for selecting some layers and request, from the central server 1000, only the selected layers of the precise digital map of the traveling path.

Figure 3:
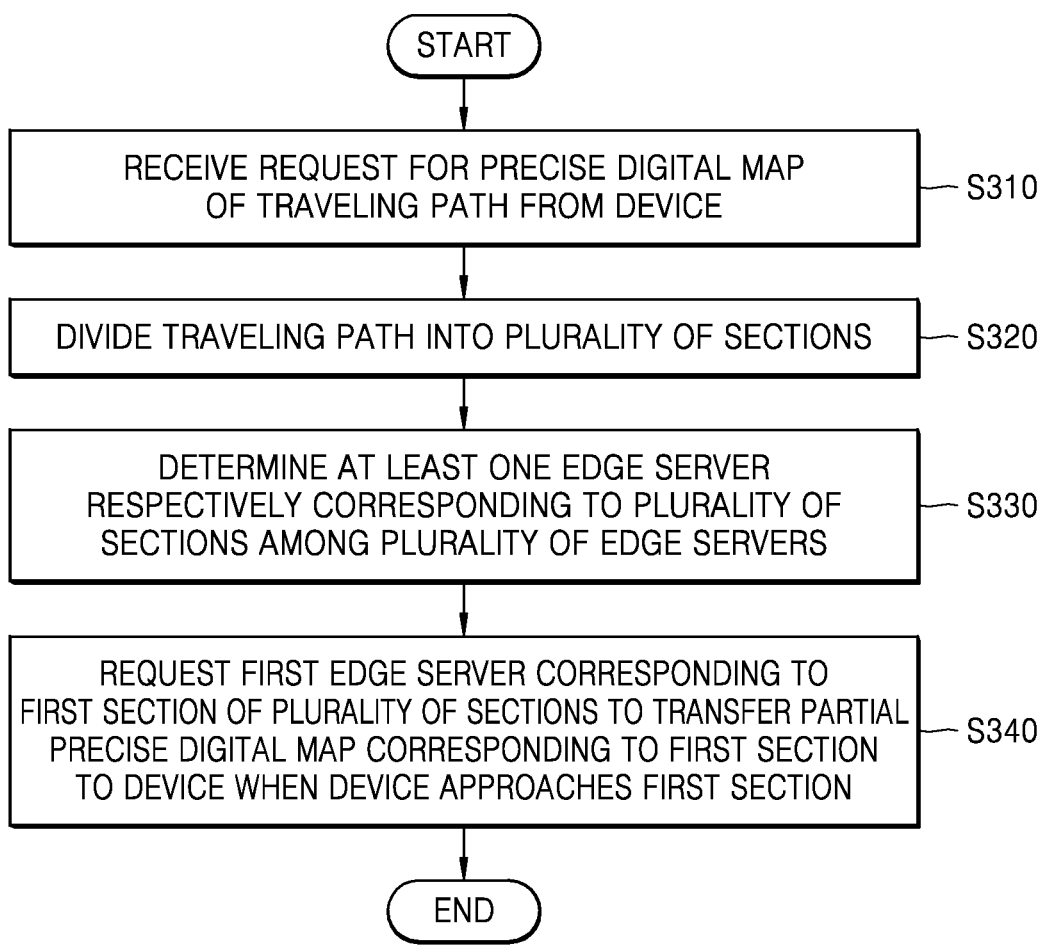
FIG. 3 is a flowchart of a method, performed by the central server, of transmitting a precise digital map to a device by using an edge server, according to an embodiment.

FIG. 3 is a flowchart of a method, performed by the central server 1000, of transmitting a precise digital map to the device 3000 by using the edge server 2000, according to an embodiment.

In operation S310, the central server 1000 may receive a request for a precise digital map of a traveling path from the device 3000.

Upon receiving a user input for inputting a destination, the device 3000 may determine a traveling path based on a current position of the device 3000 and the input destination and transmit the determined traveling path to the central server 1000. In this case, the central server 1000 may receive, together with the traveling path, a request for a precise digital map of the traveling path from the device 3000.

Alternatively, upon receiving the user input for inputting the destination, the device 3000 may transmit the current position of the device 3000 and the input destination to the central server 1000, and the central server 1000 may determine a traveling path based on the received current position of the device 3000 and the received destination and transmit the determined traveling path to the device 3000. In this case, the central server 1000 may receive, from the device 3000, a request for a precise digital map of a traveling path together with the current position of the device 3000 and the destination.

In operation S320, the central server 1000 may divide or segment the traveling path into a plurality of sections or segments.

For example, the central server 1000 may divide the traveling path into a plurality of sections based on at least one edge server 2000 geographically proximate to the traveling path.

In addition, for example, when regions respectively corresponding to a plurality of edge servers 2000 are determined, the traveling path may be divided into a plurality of sections based on the regions respectively corresponding to the plurality of edge servers 2000.

Alternatively, the central server 1000 may divide the traveling path into a plurality of sections such that the precise digital map of the traveling path is divided into partial precise digital maps of a unit size. For example, the central server 1000 may create the precise digital map of the traveling path and divide the created precise digital map such that a size of a partial precise digital map corresponding to each section is a previously determined unit size. The size may be a data size that is a portion of a total data size of the total traveling map.

Alternatively, the central server 1000 may divide the traveling path based on a unit distance or based on an expected traveling time. For example, the central server 1000 may divide the traveling path into one-kilometer units. Alternatively, the central server 1000 may divide the traveling path into ten-minute units according to an expected commuting time to traverse the traveling path.

In operation S330, the central server 1000 may determine the at least one edge server 2000 respectively corresponding to the plurality of sections among the plurality of edge servers 2000.

The central server 1000 may determine edge servers 2000 adjacent or geographically proximate to the traveling path as the at least one edge server 2000 supposed to transmit the precise digital map.

Alternatively, when regions respectively corresponding to the plurality of edge servers 2000 are determined in advance, the central server 1000 may determine edge servers 2000 corresponding to regions through which the traveling path passes, as the at least one edge server 2000 designated to transmit the precise digital map.

Alternatively, the central server 1000 may determine the edge servers 2000 respectively corresponding to the plurality of sections based on a moving direction of the device 3000. Alternatively, the central server 1000 may determine the edge servers 2000 respectively corresponding to the plurality of sections based on communication capability.

In operation S340, the central server 1000 may request a first edge server 2000a corresponding to a first section of the plurality of sections to transfer a partial precise digital map corresponding to the first section to the device 3000 when the device 3000 approaches the first section. The partial precise digital map corresponding to the portion of the traveling path may be a portion of an entire digital map corresponding to the entire traveling path.

The central server 1000 may periodically receive position information of the device 3000 from the device 3000. The central server 1000 may determine whether the device 3000 approaches the first section, based on the position information of the device 3000. When the device 3000 approaches the first section of the plurality of sections, the central server 1000 may request the first edge server 2000a corresponding to the first section to transfer the partial precise digital map corresponding to the first section to the device 3000.

Upon receiving the precise digital map transfer request from the central server 1000, the first edge server 2000a may transmit the partial precise digital map corresponding to the first section to the device 3000. In this case, the first edge server 2000a may receive the partial precise digital map corresponding to the first section from the central server 1000 and then transmit the partial precise digital map corresponding to the first section to the device 3000. Alternatively, when the first edge server 2000a previously stores the partial precise digital map corresponding to the first section, the first edge server 2000a may transmit the partial precise digital map corresponding to the first section, which is stored in the first edge server 2000a, to the device 3000. Alternatively, when the first edge server 2000a receives link information of the partial precise digital map corresponding to the first section from the central server 1000, the first edge server 2000a may receive the partial precise digital map corresponding to the first section from another server by using the received link information and then transmit the partial precise digital map corresponding to the first section to the device 3000.

Figure 4:
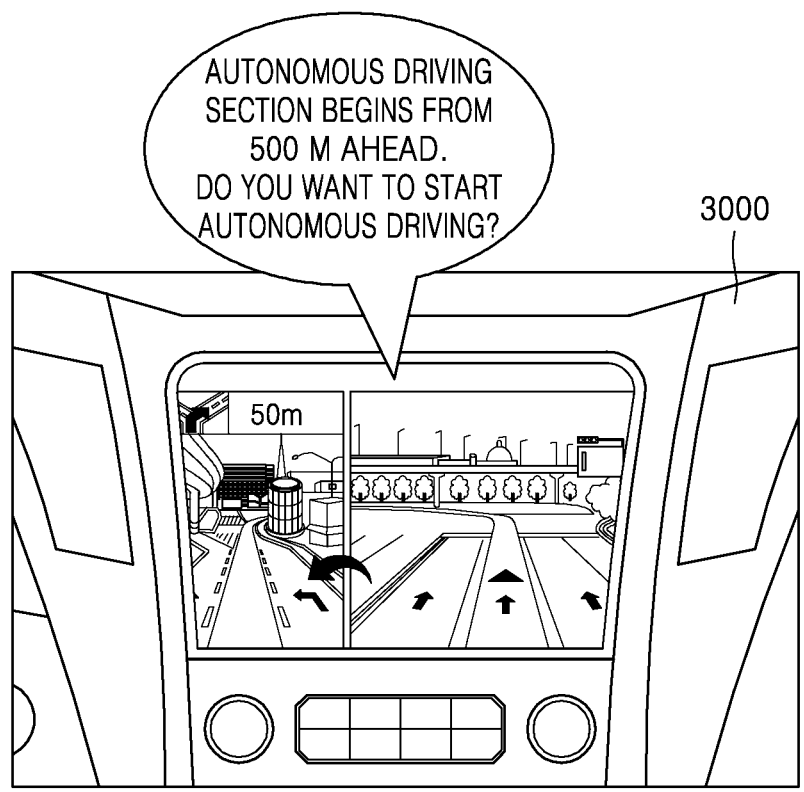
FIGS. 4 and 5 illustrate a time point at which the device requests a precise digital map from the central server, according to an embodiment.
Figure 5:
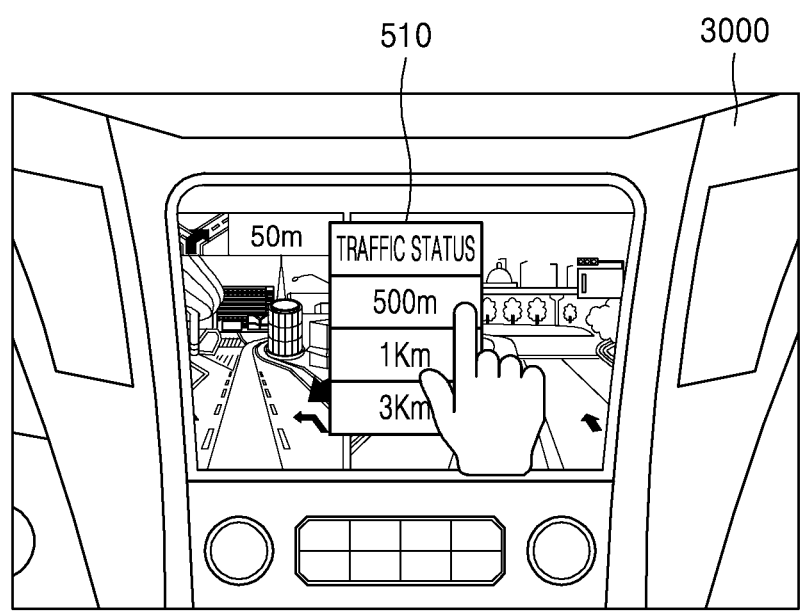

FIGS. 4 and 5 illustrate a time point at which the device 3000 requests a precise digital map from the central server 1000, according to an embodiment.

Referring to FIG. 4, the device 3000 may request a precise digital map of a traveling path from the central server 1000 upon receiving a user input for starting autonomous driving.

The device 3000 may detect a position of an autonomous driving section based on a traveling map stored in the device 3000. The device 3000 may output an image or a voice for checking whether to perform autonomous driving in the autonomous driving section while a user is driving, based on a current position of the device 3000 and the position of the autonomous driving section included in the traveling map. Upon receiving a user input for commanding start of autonomous driving, the device 3000 may request a precise digital map of the autonomous driving section from the central server 1000.

Referring to FIG. 5, upon receiving a user input for requesting a precise digital map, the device 3000 may request a precise digital map of a traveling path from the central server 1000.

The device 3000 may provide a function of displaying a precise digital map of a partial section of the traveling path of the device 3000. For example, upon receiving a user input for selecting a precise digital map providing menu 510 and selecting a section of which a precise digital map is to be displayed, the device 3000 may request the precise digital map of the selected section from the central server 1000.

In this case, the device 3000 may request some layers of a plurality of layers constituting the precise digital map. For example, the device 3000 may receive only a third layer including information of a traffic status and a signal period of a signal light among the plurality of layers from the central server 1000 and display the precise digital map to which the received third layer is reflected.

Accordingly, the user may use a precise digital map even without using an autonomous driving function.

Figure 6A:
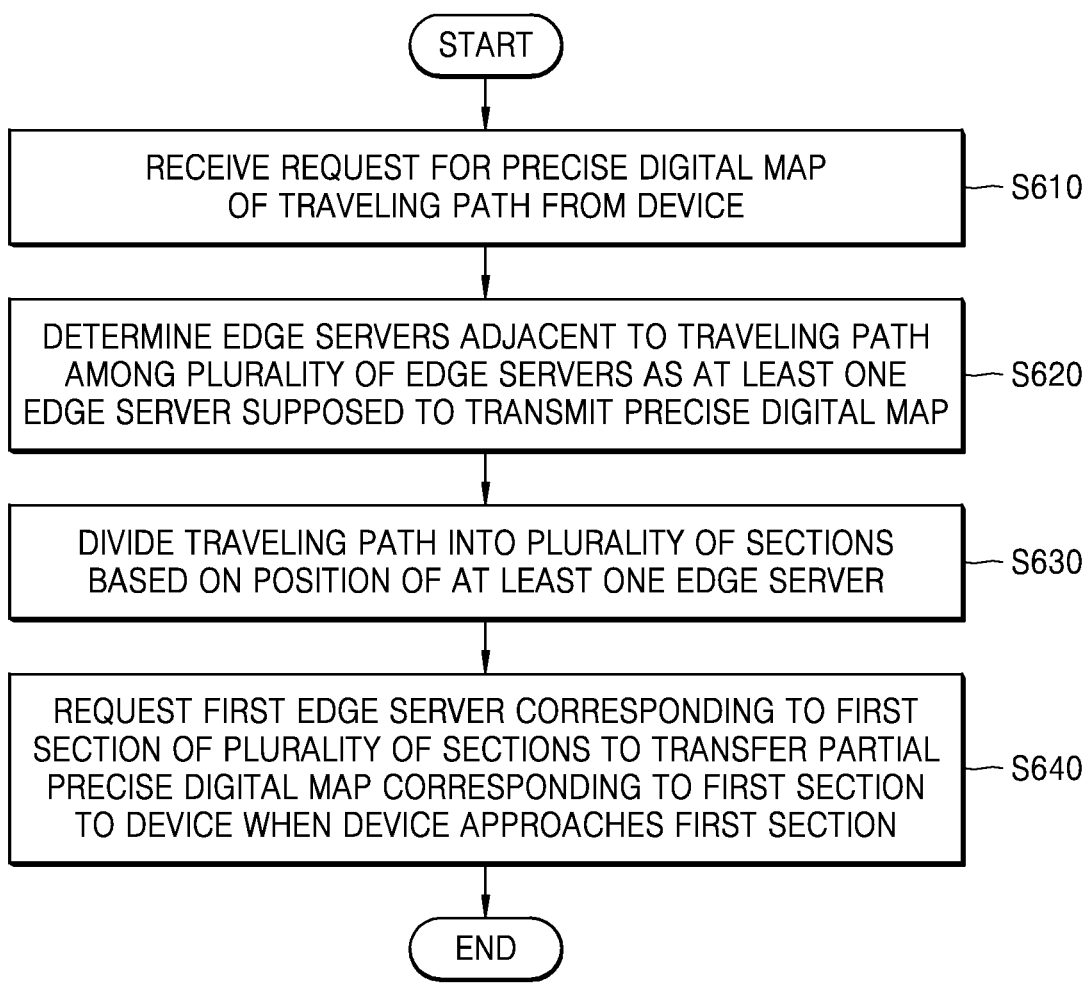
FIGS. 6A and 6B illustrate a method, performed by the central server, of dividing a traveling path into a plurality of sections based on positions of edge servers adjacent to the traveling path, according to an embodiment.
Figure 6B:
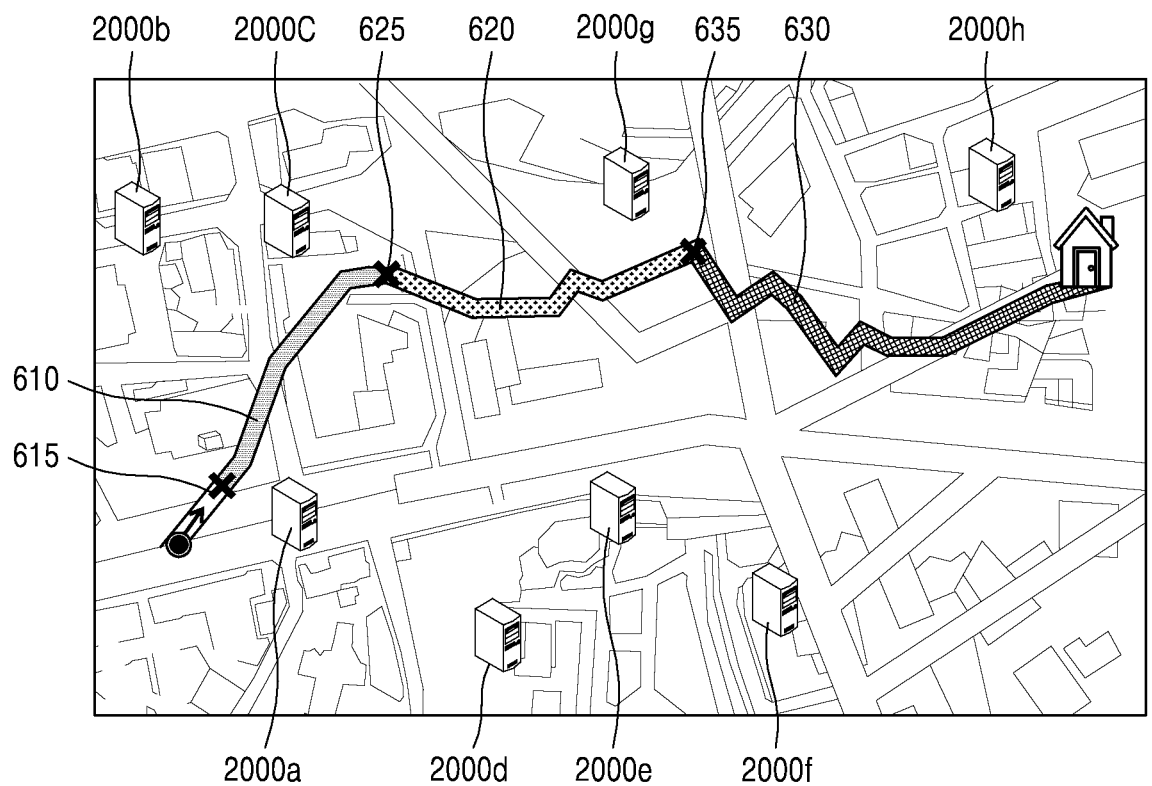

FIGS. 6A and 6B illustrate a method, performed by the central server 1000, of dividing a traveling path into a plurality of sections based on positions of edge servers 2000 adjacent to the traveling path, according to an embodiment.

In operation S610, the central server 1000 may receive a request for a precise digital map of a traveling path from the device 3000. Operation S610 may be described with reference to operation S310 of FIG. 3.

In operation S620, the central server 1000 may determine edge servers 2000 adjacent or geographically proximate to the traveling path among a plurality of edge servers 2000 as at least one edge server 2000 assigned to transmit the precise digital map to the device 3000.

The central server 1000 may acquire position information of the plurality of edge servers 2000. For example, the central server 1000 may store latitudes and longitudes of the plurality of edge servers 2000. Accordingly, the central server 1000 may determine edge servers 2000 located within a threshold distance from the traveling path based on the position information of the plurality of edge servers 2000.

For example, referring to FIG. 6B, the central server 1000 may determine a first edge server 2000a, a second edge server 2000b, and a third edge server 2000c located within the threshold distance from the traveling path among first to eighth edge servers 2000a to 2000h as the at least one edge server 2000 designated to transmit the precise digital map to the device 3000.

In operation S630, the central server 1000 may divide the traveling path into a plurality of sections based on a geographic position of the at least one edge server 2000.

The central server 1000 may divide the traveling path into a plurality of sections based on a point closest to or within a range of each of the at least one edge server 2000 among points on the traveling path. For example, referring to FIG. 6B, a point closest to the first edge server 2000a may be a first point 615, a point closest to the third edge server 2000c may be a second point 625, and a point closest to the seventh edge server 2000g may be a third point 635. Accordingly, the central server 1000 may divide the traveling path into first, second, and third sections 610, 620, and 630 based on the first point 615, the second point 625, and the third point 635.

Alternatively, the central server 1000 may divide the traveling path into a plurality of sections based on a point spaced apart by a reference distance in a moving direction from a point closest to each of the at least one edge server 2000. For example, referring to FIG. 6B, the central server 1000 may divide the traveling path into the first, second, and third sections 610, 620, and 630 based on points respectively spaced apart by the reference distance in the moving direction from the first point 615, the second point 625, and the third point 635.

The central server 1000 may assign the edge server 2000 in correspondence to each of the divided plurality of sections. For example, referring to FIG. 6B, the central server 1000 may determine the first edge server 2000a located closest to a starting position of the first section 610 as an edge server assigned to transmit a partial precise digital map of the first section 610 to the vehicle.

In operation S640, the central server 1000 may request a first edge server 2000a corresponding to a first section to transfer a partial precise digital map corresponding to the first section when the device 300 approaches the first section of the plurality of sections.

For example, referring to FIG. 6B, the central server 1000 may request the first edge server 2000a corresponding to the first section 610 to transfer a partial precise digital map corresponding to the first section 610 when the device 300 approaches the first section 610 among the first, second, and third sections 610, 620, and 630.

Figure 7A:
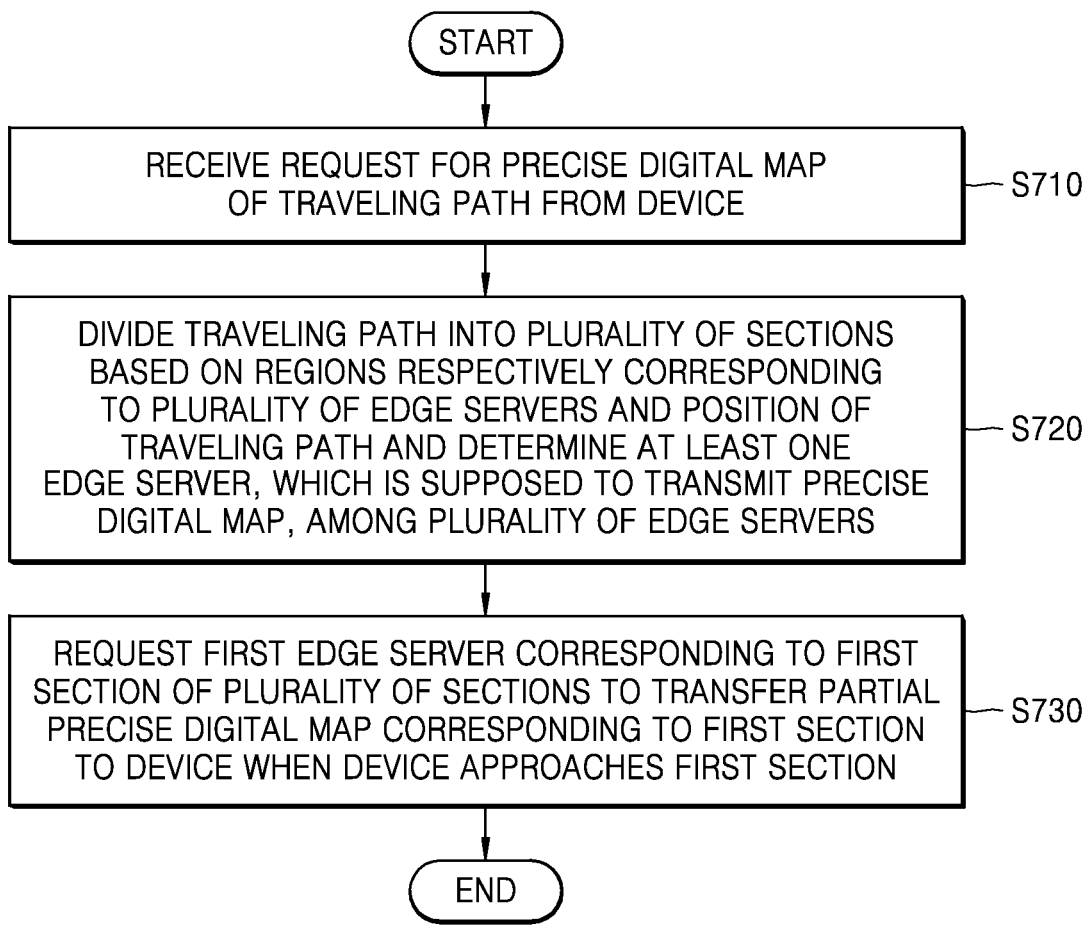
FIGS. 7A and 7B illustrate a method of dividing a traveling path into a plurality of sections based on a position of a region corresponding to each of a plurality of edge servers, according to an embodiment.
Figure 7B:
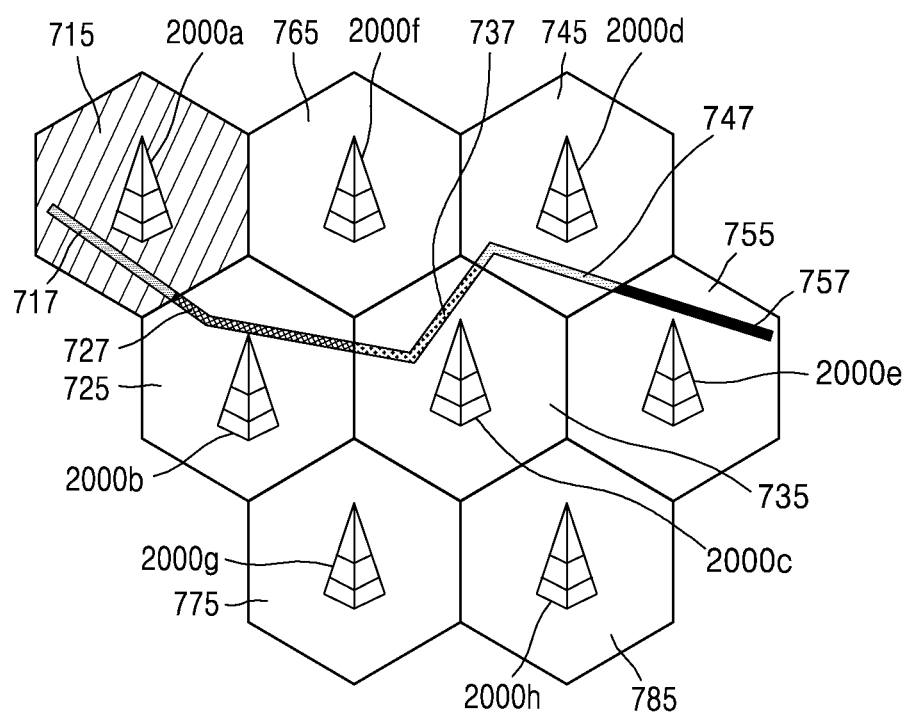

FIGS. 7A and 7B illustrate a method of dividing a traveling path into a plurality of sections based on a position of a region corresponding to each of a plurality of edge servers 2000, according to an embodiment.

In operation S710, the central server 1000 may receive a request for a precise digital map of a traveling path from the device 3000. Operation S710 may be described with reference to operation S310 of FIG. 3.

In operation S720, the central server 1000 may determine at least one edge server 2000, which is assigned to transmit the precise digital map, and a plurality of sections of the traveling path, based on a region corresponding to each of a plurality of edge servers 2000 and a position of the traveling path.

The plurality of edge servers 2000 may be assigned to a plurality of mobile communication base stations, respectively. The edge server 2000 may be located in a mobile communication base station, or may be located outside the mobile communication base station and connected to the mobile communication base station in a wired manner. In addition, regions respectively corresponding to the plurality of edge servers 2000 may be coverage areas respectively corresponding to the plurality of mobile communication base stations. In addition, the plurality of edge servers 2000 may store precise digital maps of the coverage areas corresponding to the plurality of mobile communication base stations, respectively.

Referring to FIG. 7B, a coverage area in which mobile communication may be relayed may be set in advance in correspondence to each of the plurality of (the first to eighth) edge servers 2000a to 2000h. For example, a first coverage area 715 in which communication of mobile communication devices may be relayed by a first mobile communication base station (corresponding to the first edge server 2000a) may be set around the first mobile communication base station. Accordingly, mobile communication devices located in the first coverage area 715 may communicate with other devices by using a radio resource assigned from the first mobile communication base station.

In addition, the first edge server 2000a may store a partial precise digital map of the first coverage area 715. The first edge server 2000a may receive data constituting the partial precise digital map of the first coverage area 715 from the central server 1000. In addition, the first edge server 2000a may also receive data constituting the partial precise digital map of the first coverage area 715 from a vehicle or road-side device located in the first coverage area 715.

In addition, each edge server may store partial precise digital maps of coverage areas of neighboring edge servers. For example, the third edge server 2000c may store partial precise digital maps of a second coverage area 725, a sixth coverage area 765, a fourth coverage area 745, a fifth coverage area 755, a seventh coverage area 775, and an eighth coverage area 785 which surround a third coverage area 735.

The central server 1000 may determine at least one edge server, which is designated to transmit a precise digital map, among the plurality of edge servers 2000a to 2000h based on a traveling path and positions of coverage areas.

For example, the traveling path may pass through the first coverage area 715 corresponding to the first edge server 2000a, the second coverage area 725 corresponding to the second edge server 2000b, the third coverage area 735 corresponding to the third edge server 2000c, the fourth coverage area 745 corresponding to the fourth edge server 2000d, and the fifth coverage area 755 corresponding to the fifth edge server 2000e.

Accordingly, the central server 1000 may determine edge servers corresponding to coverage areas through which the traveling path passes, as the at least one edge server 2000 designated to transmit the precise digital map to the device 3000. For example, the central server 1000 may determine the first edge server 2000a, the second edge server 2000b, the third edge server 2000c, the fourth edge server 2000d, and the fifth edge server 2000e as the at least one edge server 2000 to transmit the precise digital map to the device 3000.

In addition, the central server 1000 may determine a plurality of sections of the traveling path based on the traveling path and positions of coverage areas.

For example, the central server 1000 may divide the traveling path into a plurality of sections based on positions of coverage areas corresponding to mobile communication base stations. For example, the central server 1000 may determine a section belonging to the first coverage area 715 as a first section 717, and a section belonging to the second coverage area 725 as a second section 727.

In operation S730, the central server 1000 may request a first edge server 2000a corresponding to a first section of the plurality of sections to transfer a partial precise digital map corresponding to the first section to the device 3000 when the device 3000 approaches the first section.

The central server 1000 may distribute the plurality of sections of the traveling path to the at least one edge server 2000.

For example, the central server 1000 may assign a partial precise digital map of one section to an edge server 2000 corresponding to a coverage to which a section belongs. For example, the central server 1000 may assign a partial precise digital map of the second section 727 to the first edge server 2000a, and a partial precise digital map of a third section 737 to the second edge server 2000b.

When the device 3000 enters the second section 727 and establishes a wireless communication connection with a mobile communication base station corresponding to the second edge server 2000b, the central server 1000 may request the second edge server 2000b to transfer the partial precise digital map corresponding to the third section 737 to the device 3000.

Therefore, when the device 3000 enters the second section 727 and establishes a wireless communication connection with the mobile communication base station corresponding to the second edge server 2000b, the central server 1000 may receive in advance the partial precise digital map of the third section 737 from the mobile communication base station corresponding to the second edge server 2000b.

In this case, the device 3000 may receive a partial precise digital map of the first section 717 from the central server 1000, or according to an embodiment, from the first edge server 2000a.

According to an embodiment, the central server 1000 may transmit a partial precise digital map of one section to a mobile station base station of a coverage area to which the section belongs. For example, the partial precise digital map of the first section 717 may be assigned to the mobile communication base station corresponding to the first edge server 2000a, and the partial precise digital map of the second section 727 may be assigned to the mobile communication base station corresponding to the second edge server 2000b.

Figure 8B:
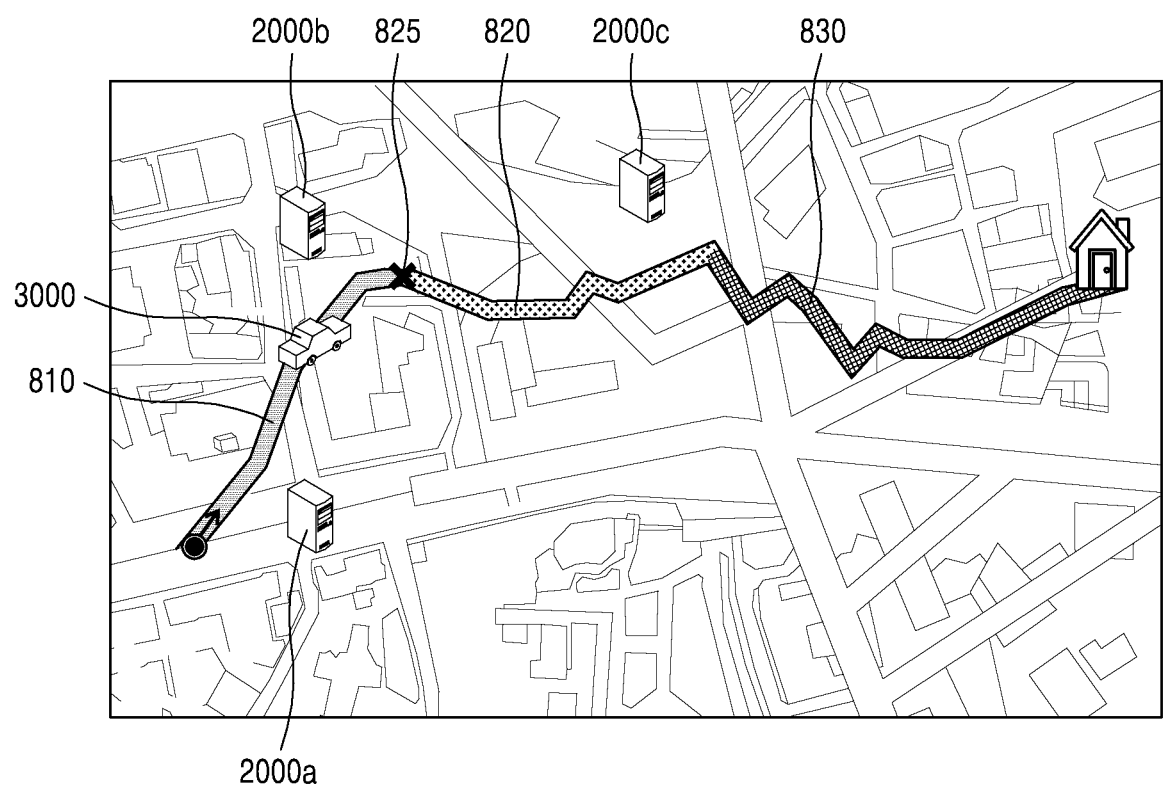

FIGS. 8A and 8B illustrate a time point at which the device 3000 receives a partial precise digital map of a section from the central server 1000, according to an embodiment;

In operation S810, the device 3000 may request a precise digital map of a traveling path from the central server 1000.

In this case, the device 3000 may request the precise digital map together with identification information of a vehicle from the central server 1000. In addition, operation S810 may be described with reference to operation S310 of FIG. 3.

In operation S820, the device 3000 may divide the traveling path into a plurality of sections including the section.

The section may be a starting section of the traveling path, a section located in the middle of the traveling path, or a last section of the traveling path. Operation S820 may be described with reference to operations S320 and S330 of FIG. 3.

In operation S830, the device 3000 may transmit position information of the device 3000 to the central server 1000.

The device 3000 may periodically transmit position information of the device 3000 to the central server 1000. The device 3000 may detect a position of the device 3000 by using a GPS embedded in the device 3000 and transmit information on the detected position to the central server 1000.

In operation S840, the central server 1000 may determine a time point at which the partial precise digital map of the section is transmitted to the device 3000, when the device 3000 approaches the section of the plurality of sections.

The central server 1000 may transmit the partial precise digital map of the section to the device 3000 at a time point at which the device 3000 enters within a previously determined distance from a starting position of the section. For example, referring to FIG. 8B, the central server 1000 may determine whether the device 3000 has entered within a previously determined distance from a starting position 825 of a section 820, based on a current position of the device 3000, and transmit a partial precise digital map of the section 820 to the device 3000 when the device 3000 enters within the previously determined distance from the starting position 825 of the section 820.

According to an embodiment, the central server 1000 may transmit the partial precise digital map of the section to the device 3000 at a time point at which an expected time to the starting position of the section is within a previously determined time. For example, referring to FIG. 8B, the central server 1000 may calculate an expected traveling time from a current position of the device 3000 to the starting position 825 of the section 820 based on a traffic status of a traveling path. The central server 1000 may transmit the partial precise digital map of the section 820 to the device 3000 by determining that the expected traveling time from the current position of the device 3000 to the starting position 825 of the section 820 is within a previously determined time.

In operation S850, the central server 1000 may request an edge server 2000 corresponding to the section to transfer the partial precise digital map corresponding to the section to the device 3000.

For example, referring to FIG. 8B, the central server 1000 may request a second edge server 2000b corresponding to the second section 820 to transmit the partial precise digital map corresponding to the second section 820 to the device 3000.

In operation S860, the second edge server 2000b corresponding to the second section may transmit the partial precise digital map corresponding to the second section to the device 3000.

For example, referring to FIG. 8B, the second edge server 2000b corresponding to the second section 820 may transmit the partial precise digital map corresponding to the second section 820 to the device 3000 before the device 3000 arrives at the second section 820.

Accordingly, the device 3000 may receive a precise digital map having a large data size without delay and receive the latest data of a precise digital map of a traveling path.

Figure 9B:
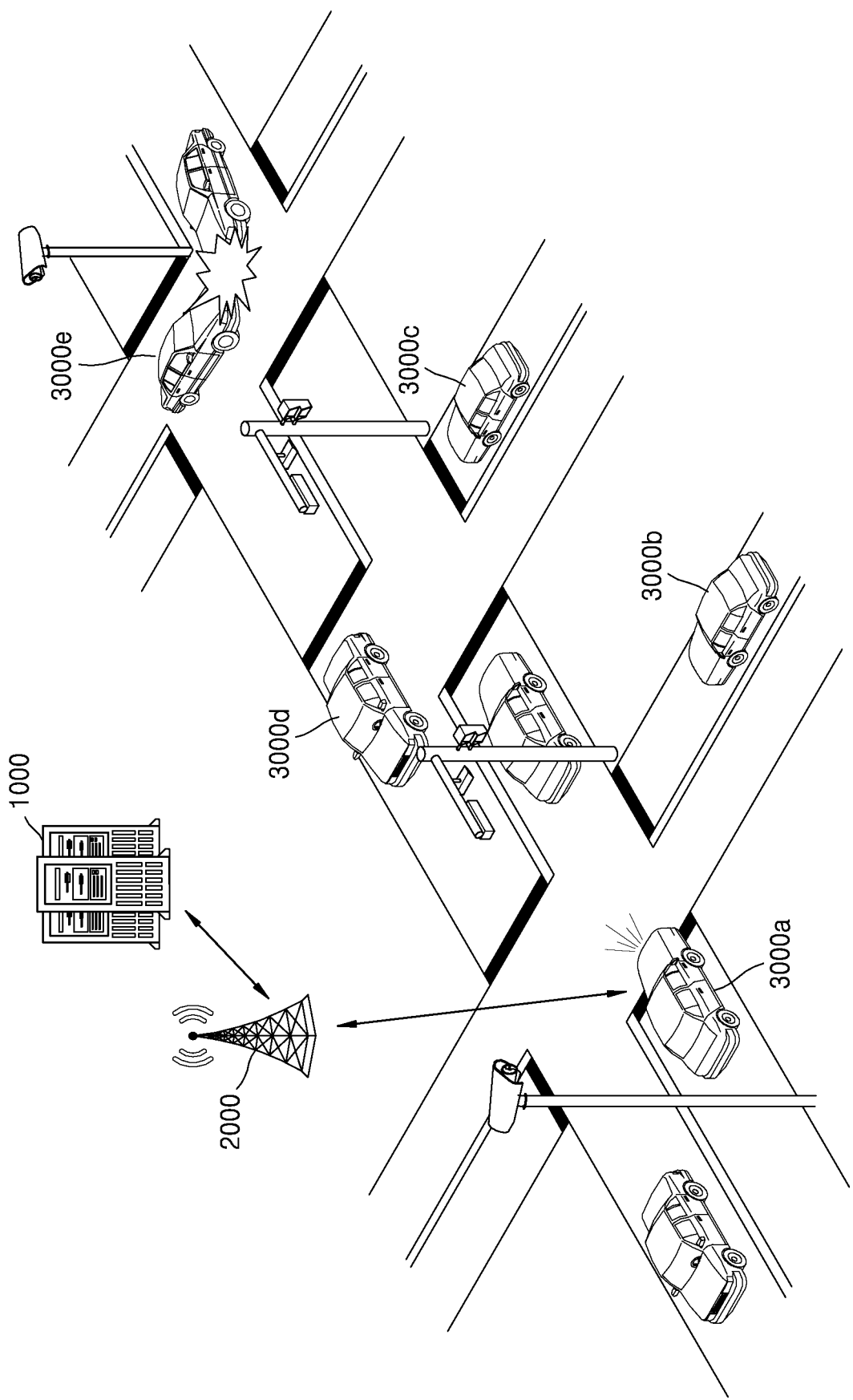

FIGS. 9A and 9B illustrate a method of receiving, by the device 3000, a partial precise digital map from an edge server 2000, according to an embodiment.

In operation S910, the device 3000 may transmit a request for a precise digital map of a traveling path to the central server 1000. In operation S920, the central server 1000 may determine at least one edge server 2000, which is to transmit the precise digital map, among a plurality of edge servers 2000. In operation S930, the central server 1000 may distribute a plurality of sections of the traveling path to at least one edge server 2000. Operations S910 to S930 may be described with reference to operations S310 to S330 of FIG. 3.

In operation S940, the central server 1000 may request a first edge server 2000a corresponding to a first section to transfer a partial precise digital map corresponding to the first section to the device 3000.

In this case, the central server 1000 may also transmit identification information of the device to the first edge server 2000a. In addition, the central server 1000 may also transmit position information of the device to the first edge server 2000a.

In operation S950, the first edge server 2000a may transmit the partial precise digital map corresponding to the first section to the device 3000.

In this case, the first edge server 2000a may have established a wireless communication connection with the device 3000. For example, referring to FIG. 9B, when the plurality of edge servers 2000 are mobile communication base stations, the first edge server 2000a may have established wireless communication connections with first to fifth devices 3000a to 3000e. Accordingly, the first edge server 2000a may transmit the partial precise digital map corresponding to the first section to the first device 3000a which has requested a precise digital map among the first to fifth devices 3000a to 3000e that have established wireless communication connections with the first edge server 2000a, based on the identification information of the first device 3000a, which has been received from the central server 1000.

Figure 10A:
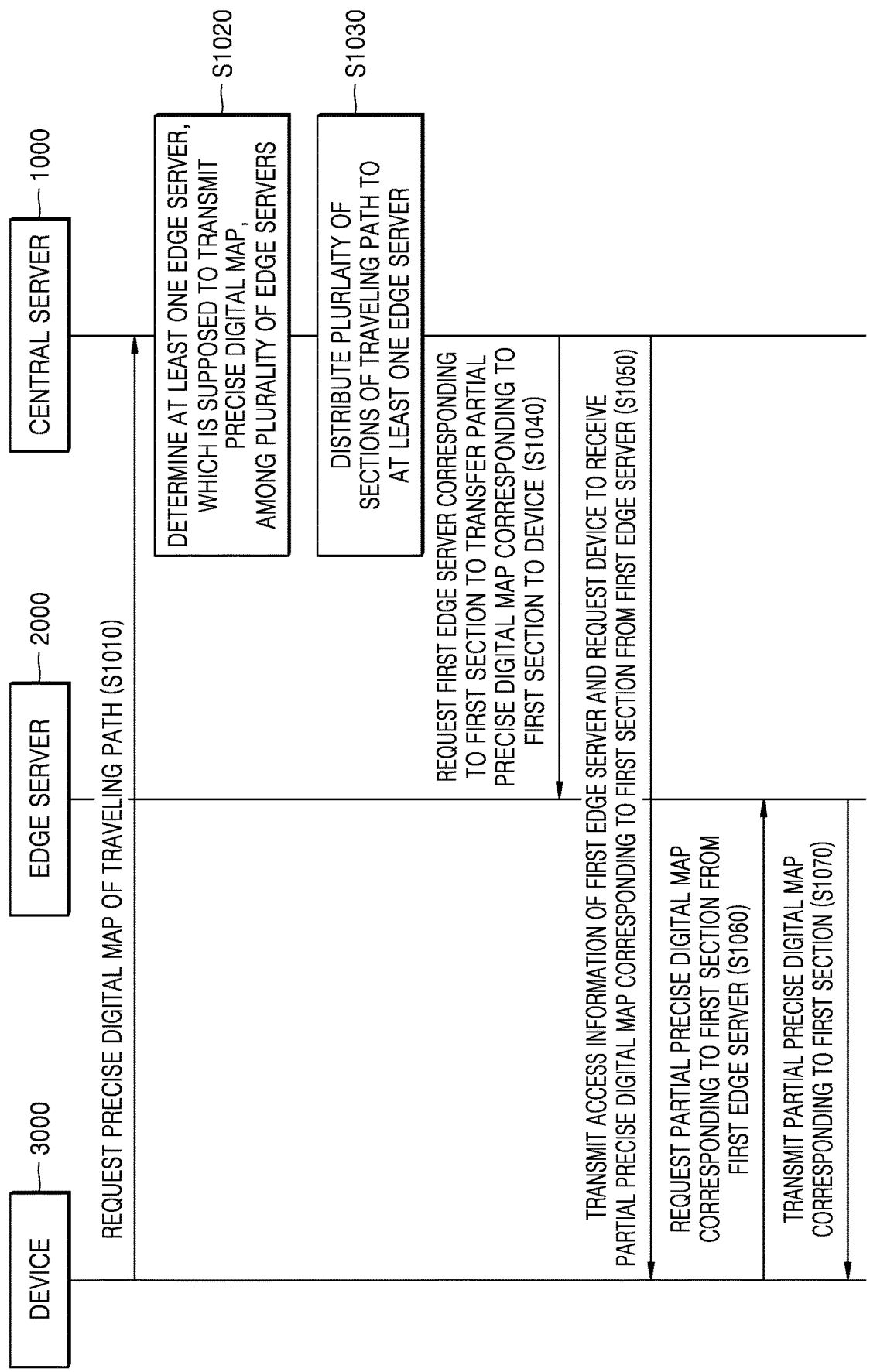
FIGS. 10A and 10B illustrate a method of receiving, by the device, a partial precise digital map from an edge server, according to other embodiments.
Figure 10B:
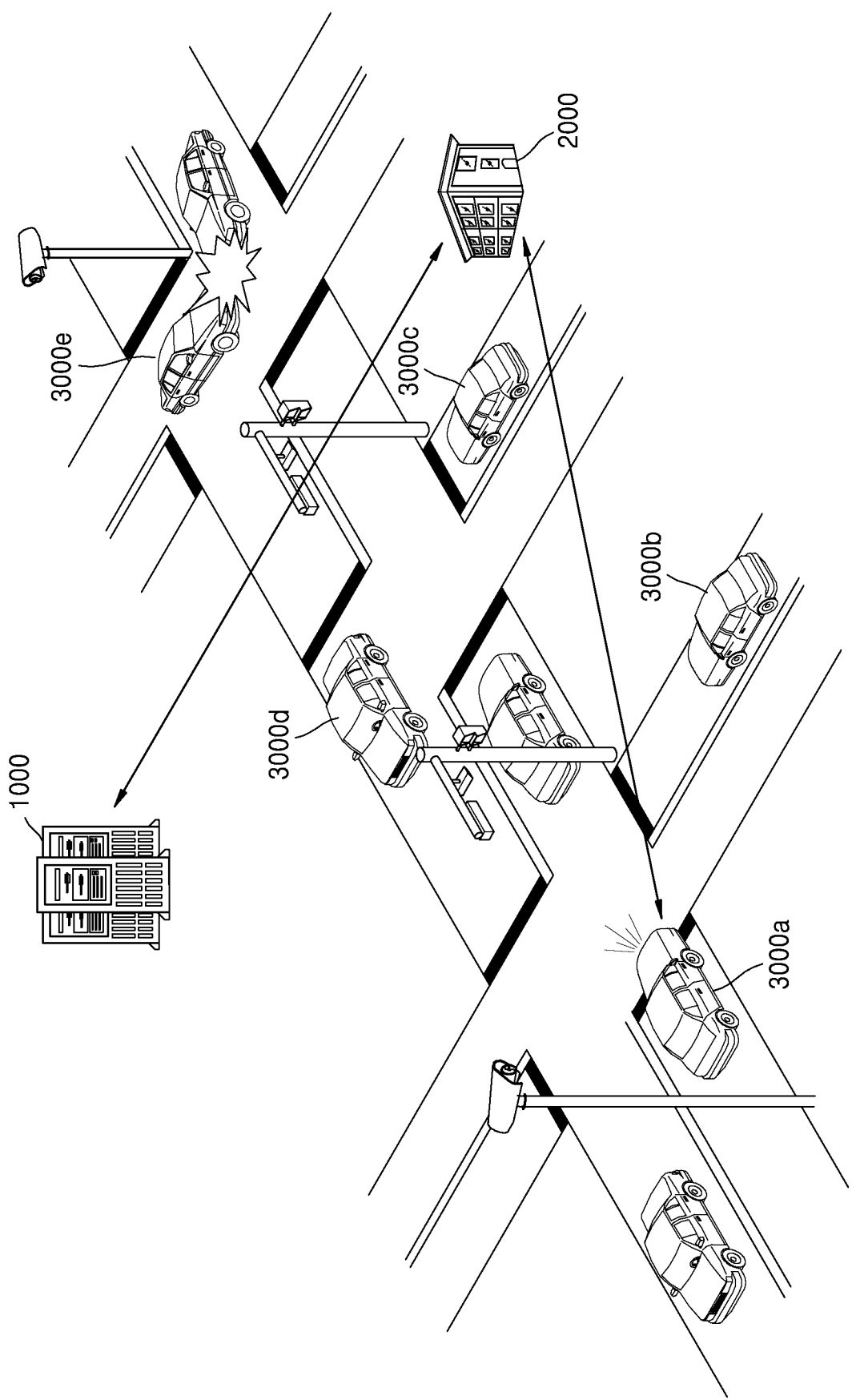

FIGS. 10A and 10B illustrate a method of receiving, by the device 3000, a partial precise digital map from an edge server 2000, according to other embodiments.

In operation S1010, the device 3000 may transmit a request for a precise digital map of a traveling path to the central server 1000. In operation S1020, the central server 1000 may determine at least one edge server 2000, which is to transmit the precise digital map, among a plurality of edge servers 2000. In operation S1030, the central server 1000 may distribute a plurality of sections of the traveling path to at least one edge server 2000. In operation S1040, the central server 1000 may request a first edge server 2000a corresponding to a first section to transfer a partial precise digital map corresponding to the first section to the device 3000. Operations S1010 to S1040 may be described with reference to operations S910 to S940 of FIG. 9A.

For example, referring to FIG. 10B, the first edge server 2000a may be a general server connectable using access information such as a uniform resource locator (URL). Accordingly, the first to fifth devices 3000a to 3000e may establish a communication connection with the first edge server 2000a by using an Internet protocol (IP) address of the first edge server 2000a.

In operation S1050, the central server 1000 may transmit access information of the first edge server 2000a to the device 3000 and request the device 3000 to receive the partial precise digital map corresponding to the first section from the first edge server 2000a.

In operation S1060, the device 3000 may request the partial precise digital map corresponding to the first section from the first edge server 2000a.

The device 3000 may establish a communication connection with the first edge server 2000a based on the access information of the first edge server 2000a, which has been received from the central server 1000, and request the partial precise digital map corresponding to the first section from the first edge server 2000a.

In operation S1070, the first edge server 2000a may transmit the partial precise digital map corresponding to the first section to the device 3000 based on the communication connection established with the first edge server 2000a.

Figure 11A:
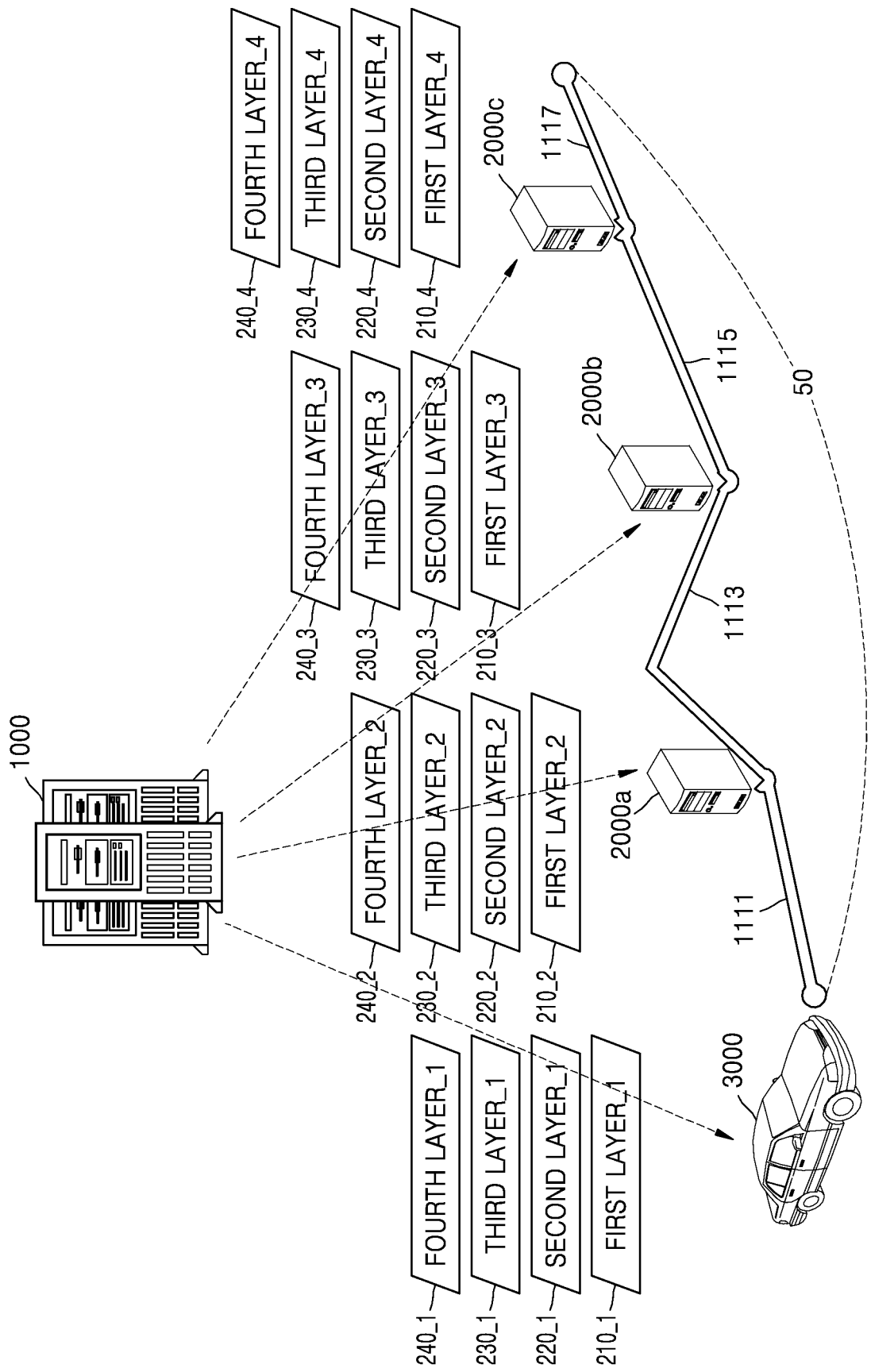
FIGS. 11A to 11C illustrate a method of receiving, by the device, a plurality of layers while moving along a traveling path, according to an embodiment.
Figure 11B:
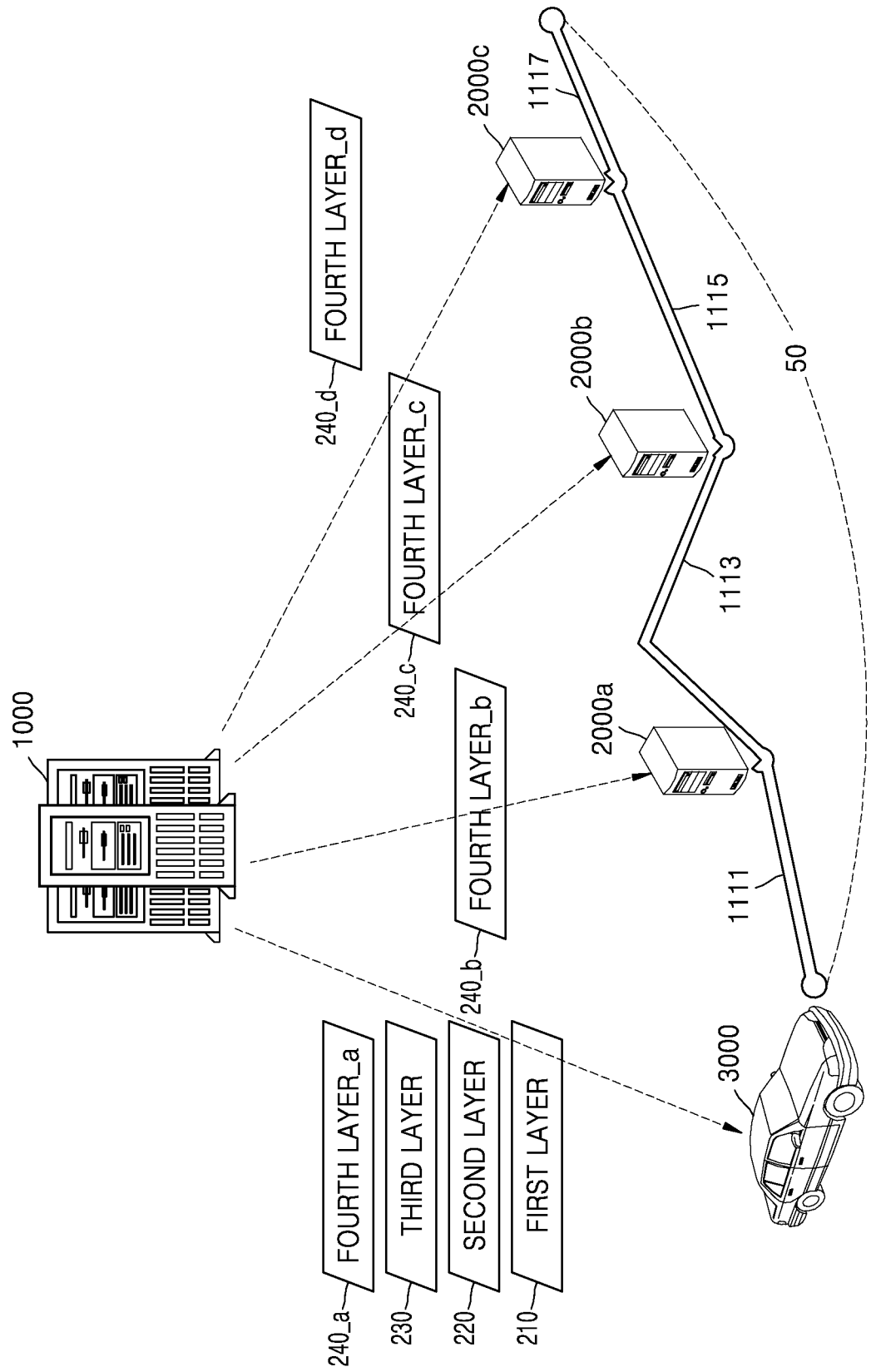
Figure 11C:
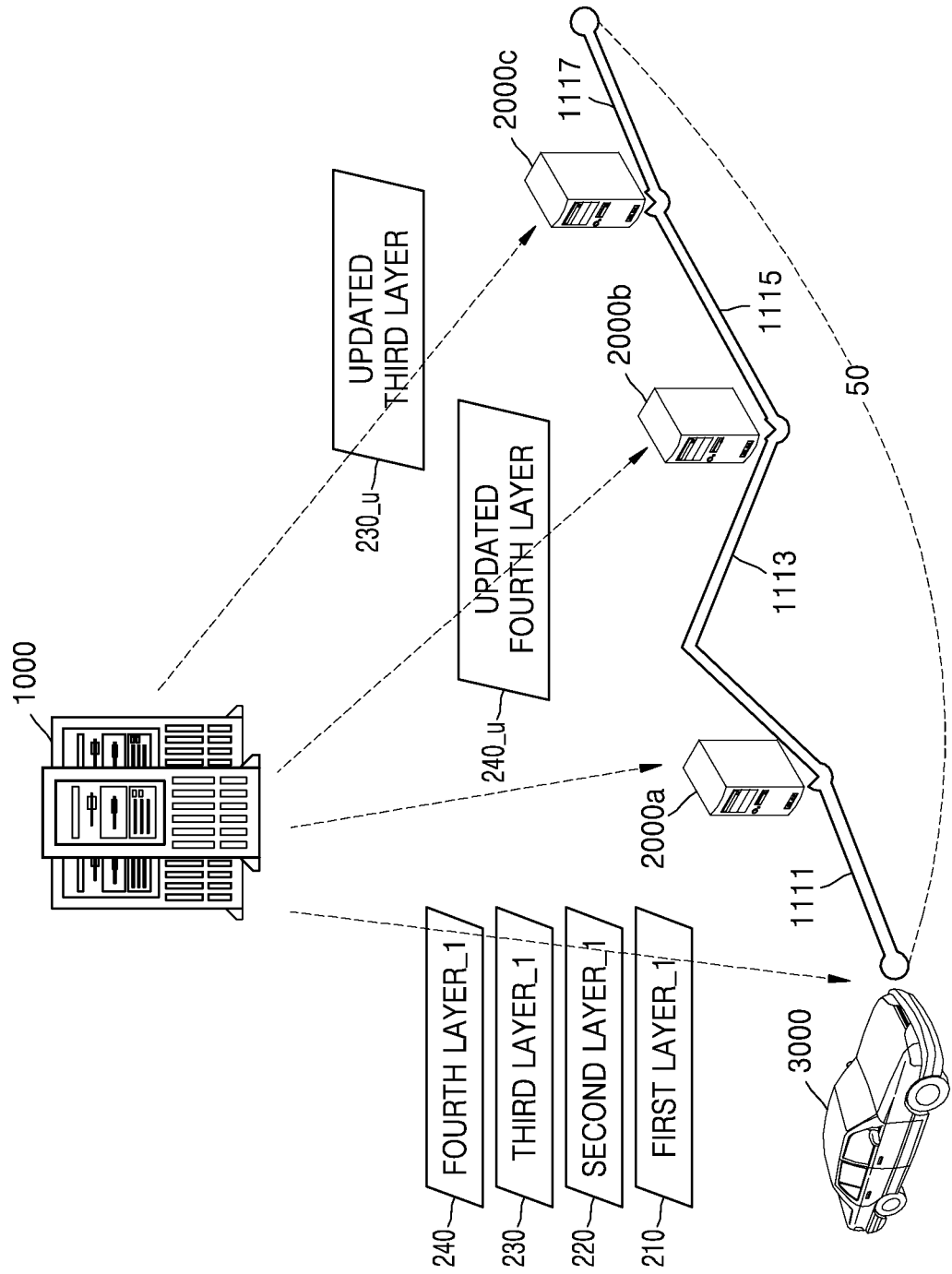

FIGS. 11A to 11C illustrate a method of receiving, by the device 3000, a plurality of layers while moving along the traveling path 50, according to an embodiment.

Referring to FIG. 11A, the device 3000 may receive a precise digital map in a first method of receiving data corresponding to each section among data of a plurality of layers, while moving along each section.

For example, the traveling path 50 may be divided into a first section 1111, a second section 1113, a third section 1115, and a fourth section 1117, and before or when starting autonomous driving, the device 3000 may receive data 210_1, 220_1, 230_1, and 240_1 corresponding to the first section 1111 among the data of the plurality of layers from the central server 1000.

In addition, in response to moving from the first section 1111 to the second section 1113, the device 3000 may receive data 210_2, 220_2, 230_2, and 240_2 corresponding to the second section 1113 among the data of the plurality of layers from the first edge server 2000a.

In addition, in response to moving from the second section 1113 to the third section 1115, the device 3000 may receive data 210_3, 220_3, 230_3, and 240_3 corresponding to the third section 1115 among the data of the plurality of layers from the second edge server 2000b.

In addition, in response to moving from the third section 1115 to the fourth section 1117, the device 3000 may receive data 210_4, 220_4, 230_4, and 240_4 corresponding to the fourth section 1117 among the data of the plurality of layers from the second edge server 2000b.

When a precise digital map of the traveling path 50 is not stored in the device 3000 for such a reason that the device 3000 has not passed through the traveling path 50 input by a user, the device 3000 may request the central server 1000 to transmit the precise digital map to the device 3000. Alternatively, the device 3000 may display a user interface for selecting one of a plurality of methods of receiving a precise digital map, and request the central server 1000 to transmit the precise digital map to the device 3000 by the first method upon receiving a user input for selecting the first method.

Referring to FIG. 11B, the device 3000 may receive the precise digital map in a method of receiving only a first layer 210, a second layer 220, and a third layer 230 having a low change possibility among a plurality of layers corresponding to the entire traveling path 50 from the central server before starting to drive and separately receiving a fourth layer 240_a, 240_b, 240_c, and 240_d having a high real-time change possibility from the central server or edge servers 2000a, 2000b, and 2000c while moving along the traveling path 50.

In this case, when the first to third layers 201 to 230 are received, the device 3000 may transmit creation times of the first to third layers 201 to 230, which are stored in the device 3000, to the central server 1000 and receive, from the central server 1000, only an updated portion of a layer of which a creation time is updated.

For example, when a precise digital map of the entire traveling path 50 or a portion of the traveling path 50 is stored in the device 3000 for such a reason that the device 3000 has passed through the input traveling path 50 or the portion of the traveling path 50 by means of autonomous driving, the device 3000 may receive, from the central server 1000, only an updated portion of a layer of which a creation time is updated.

In addition, the device 3000 may receive data 240_1 corresponding to the first section 1111 among data of the fourth layer from the central server 1000 before or when starting to drive. In addition, in response to moving from the first section 1111 to the second section 1113, the device 3000 may receive data 240_2 corresponding to the second section 1113 among the data of the fourth layer from the central server 1000. In addition, in response to moving from the second section 1113 to the third section 1115, the device 3000 may receive data 240_3 corresponding to the third section 1115 among the data of the fourth layer from the central server 1000. In addition, in response to moving from the third section 1115 to the fourth section 1117, the device 3000 may receive data 240_4 corresponding to the fourth section 1117 among the data of the fourth layer from the central server 1000.

Accordingly, the device 3000 may receive latest updated data even when the data of the fourth layer is changed during driving.

Referring to FIG. 11C, the device 3000 may receive the precise digital map in a method of receiving the entire precise digital map of the traveling path 50 before starting to drive and receiving an updated portion of an updated layer during driving while moving along the traveling path 50.

In this case, when the entire precise digital map of the traveling path 50 is received before starting to drive, if a precise digital map of the entire traveling path 50 or a portion of the traveling path 50 is stored in the device 3000, the device 3000 may transmit creation times of first to fourth layers 210 to 240, which are stored in the device 3000, to the central server 1000 and receive, from the central server 1000, only an updated portion of a layer of which a creation time is updated.

When data of some of a plurality of layers is changed while the device 3000 is moving along the traveling path 50, changed portions of the changed layers may be received. For example, when data corresponding to the third section 1115 among data of a fourth layer while the device 3000 is moving along the second section 1113, the central server 1000 may request the device 3000 to receive changed data 240_u of the fourth layer from the second edge server 2000b. In addition, when data corresponding to the fourth section 1117 among data of a third layer while the device 3000 is moving along the third section 1115, the central server 1000 may request the device 3000 to receive changed data 230_u of the third layer from the third edge server 2000c. The device 3000 may receive the updated data 240_u of the fourth layer from the second edge server 2000b and the updated data 230_u of the third layer from the third edge server 2000c during driving.

Figure 12:
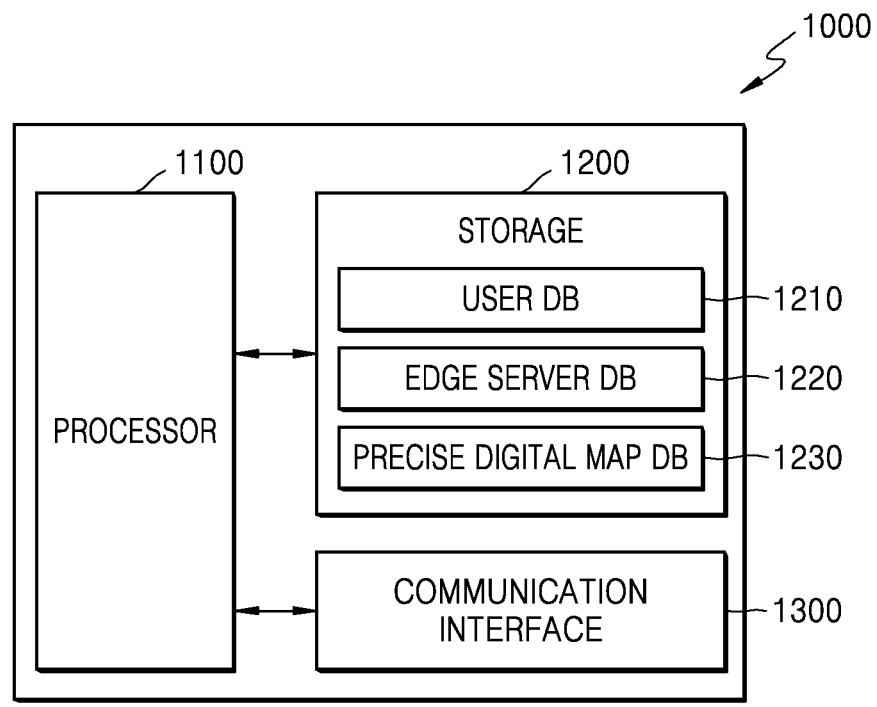
FIG. 12 is a block diagram of the central server according to an embodiment.

FIG. 12 is a block diagram of the central server 1000 according to an embodiment.

The central server 1000 according to an embodiment may include a processor 1100, a storage 1200, and a communication interface 1300. However, not all of the components shown in FIG. 12 are mandatory components of the central server 1000. The central server 1000 may be implemented by components other than the components shown in FIG. 12.

For example, the central server 1000 according to an embodiment may be implemented using only the processor 1100 or using only the processor 1100 and the communication interface 1300.

The communication interface 1300 may include one or more components allowing the central server 1000 to communicate with other devices. In addition, the communication interface 1300 may be configured to communicate with other devices. The communication interface 1300 may be a transceiver that includes a transmitter configured to transmit data to an external device and a receiver configured to receive data from an external device.

The communication interface 1300 may be configured to transmit and receive data to and from the device 3000 or an edge server 2000 by using a broadband network such as the Internet.

The storage 1200 may store programs for processing and control of the processor 1100 and store data input to the central server 1000 or output from the central server 1000.

The storage 1200 may be memory storing a precise digital map.

The storage 1200 may include at least one type of storage medium from among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc.

The processor 1100 may commonly control a general operation of the central server 1000. For example, the processor 1100 may generally control the storage 1200, the communication interface 1300, and the like by executing programs stored in the storage 1200. The processor 1100 may control operations of the central server 1000 to perform the functions of the central server 1000, which are disclosed with reference to FIGS. 1 to 10B.

The processor 1100 may receive a request for a precise digital map of a traveling path from the device 3000 of a vehicle through the receiver.

In addition, the processor 1100 may determine at least one edge server 2000, which is to transmit the precise digital map, among a plurality of edge servers 2000 and distribute a plurality of sections of the traveling path to the at least one edge server 2000.

In addition, the processor 1100 may request, through the transmitter, a first edge server 2000a corresponding to a first section of the plurality of sections among the at least one edge server 2000 to transfer a partial precise digital map corresponding to the first section to the device 3000 of the vehicle when the vehicle approaches the first section.

Alternatively, the processor 1100 may determine edge servers 2000 adjacent to the traveling path among the plurality of edge servers 2000 as at least one edge server 2000 and divide the traveling path into a plurality of sections based on positions of the determined at least one edge server 2000.

Alternatively, the storage 1200 may store precise digital maps of regions corresponding to the plurality of edge servers 2000, respectively, and the processor 1100 may determine at least one edge server 2000, which is to transmit a precise digital map, among the plurality of edge servers 2000 and a plurality of sections of the traveling path based on positions of the regions respectively corresponding to the plurality of edge servers 2000.

In addition, the edge server 2000 is a server assigned to a base station for relaying mobile communication, and the regions respectively corresponding to the plurality of edge servers 2000 may include a coverage area of the base station and at least one of coverage areas of other base stations adjacent to the base station.

Alternatively, the processor 1100 may request, through the transmitter, the first edge server 2000a to transfer the partial precise digital map corresponding to the first section to the device 3000 of the vehicle when the vehicle enters within a previously determined distance from a starting position of the first section.

Alternatively, the processor 1100 may request, through the transmitter, the first edge server 2000a to transfer the partial precise digital map corresponding to the first section to the device 3000 of the vehicle when an expected traveling time to the starting position of the first section is within a previously determined time.

In addition, the processor 1100 may request the first edge server 2000a to transfer the partial precise digital map corresponding to the first section to the device 3000 of the vehicle, by transmitting identification information of the vehicle to the first edge server 2000a corresponding to the first section.

Alternatively, the processor 1100 may request the device 3000 of the vehicle to receive the partial precise digital map corresponding to the first section from the first edge server 2000a corresponding to the first section, by transmitting access information of the first edge server 2000a corresponding to the first section to the device 3000 of the vehicle.

Alternatively, the precise digital map includes a plurality of layers respectively including information on objects different from each other, and processor 1100 may request the first edge server 2000a to transfer a first layer among the plurality of layers to the device 3000 of the vehicle, upon receiving a request for the first layer among the plurality of layers from the device 3000 of the vehicle.

Alternatively, the storage 1200 may store an updated time of the precise digital map, the receiver may receive a creation time of a precise digital map stored in the device 3000 of the vehicle from the device 3000 of the vehicle, and the processor 1100 may transmit, to the device 3000 of the vehicle, only layers of which the creation time of the precise digital map stored in the device 3000 of the vehicle is earlier than the updated time.

In addition, the storage 1200 may include a user database (DB) 1210, an edge server DB 1220, and a precise digital map DB 1230. The user DB 1210 may store identification information of users to which a precise digital map service is provided, identification information of the devices 3000 of the users, billing information of the users, and the like. In addition, the edge server DB 1220 may store identification information of edge servers 2000 controlled by the central server 1000, geographical position information of the edge servers 2000, access information of the edge servers 2000, identification information of precise digital maps respectively stored in the edge servers 2000, and the like. In addition, the precise digital map DB 1230 may store a precise digital map of a territory of a nation for which the precise digital map service is provided. Alternatively, the storage 1200 may store access information of a server which stores a precise digital map.

Figure 13:
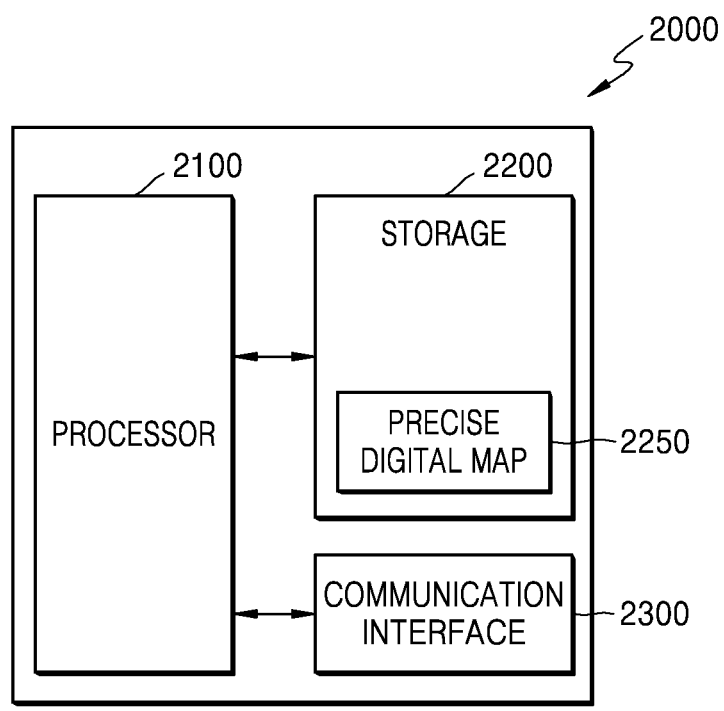
FIG. 13 is a block diagram of an edge server according to an embodiment.

FIG. 13 is a block diagram of an edge server 2000 according to an embodiment.

The edge server 2000 according to an embodiment may include a processor 2100, a storage 2200, and a communication interface 2300. However, not all of the components shown in FIG. 13 are mandatory components of the edge server 2000. The edge server 2000 may be implemented by components other than the components shown in FIG. 13.

For example, the edge server 2000 according to an embodiment may be implemented using only the processor 2100 or using only the communication interface 2300 and the processor 2100.

The communication interface 2300 may be configured to communicate with the outside. The communication interface 2300 may include a transmitter configured to transmit data to an external device and a receiver configured to receive data from an external device.

In addition, the communication interface 2300 may be configured to transmit to and receive data from the central server 1000 by using a wired network. In addition, the communication interface 2300 may be configured to transmit to and receive data from the device 3000 using a wireless network. In addition, the communication interface 2300 may include a base station antenna and may be configured to transmit to and receive data from an external device by using the base station antenna.

The processor 2100 may commonly control a general operation of the edge server 2000. For example, the processor 2100 may generally control the storage 2200, the communication interface 2300, and the like by executing programs stored in the storage 2200. The processor 2100 may control operations of the edge server 2000 to perform the functions of the edge server 2000, which are disclosed with reference to FIGS. 1 to 11C.

The processor 2100 may receive a request for transmission of a partial precise digital map to the device 3000, from the central server 1000 through the communication interface 2300. In addition, the processor 2100 may receive the partial precise digital map from the central server 1000 through the communication interface 2300. Alternatively, the processor 2100 may receive access information of the partial precise digital map from the central server 1000 and receive the partial precise digital map from another server based on the received access information.

In addition, the processor 2100 may transmit the partial precise digital map to the device 3000 through the communication interface 2300.

The storage 2200 may store programs for processing and control of the processor 2100 and store data input to the edge server 2000 or output from the edge server 2000.

The storage 2200 may include at least one type of storage medium from among a flash memory type memory, a hard disk type memory, a multimedia card micro type memory, a card type memory (e.g., an SD or XD memory), RAM, SRAM, ROM, EEPROM, PROM, a magnetic memory, a magnetic disc, and an optical disc.

The storage 2200 may store a precise digital map 2250 received from the central server 1000 or another server.

Figure 14:
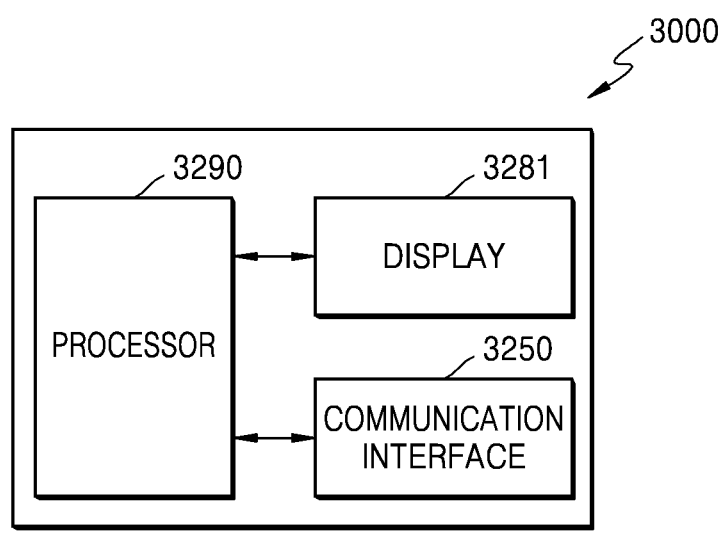
FIG. 14 is a block diagram of the device according to an embodiment.

FIG. 14 is a block diagram of the device 3000 according to an embodiment.

As shown in FIG. 14, the device 3000 according to an embodiment may include a processor 3290, a display 3281, and a communication interface 3250. However, not all of the components shown in FIG. 14 are mandatory components of the device 3000. The device 3000 may be implemented by components other than the components shown in FIG. 14.

For example, the device 3000 according to an embodiment may be implemented using only the processor 3290 or using only the communication interface 3250 and the processor 3290.

In addition, for example, the device 3000 according to an embodiment may further include a user input interface, an output interface, a sensor, an audio/video (A/V) input interface, and a memory besides the communication interface 3250, the display 3281, and the processor 3290.

The user input interface indicates a means to input data for a user to control the device 3000.

For example, the user input interface may receive a user input for requesting a precise digital map. In addition, the user input interface may receive a user input for requesting autonomous driving.

In addition, the user input interface may include a key pad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto.

The output interface may output an audio signal, a video signal, or a vibration signal and may include the display 3281, an acoustic output interface, and a vibration motor.

The display 3281 outputs information processed by the device 3000. For example, the display 3281 may display a precise digital map of a traveling path. Alternatively, the display 3281 may display only some of a plurality of layers according to an input of a user.

When the display 3281 and a touch pad form a layer structure to configure a touch screen, the display 3281 may be used as not only an output device but also an input device. The display 3281 may include at least one of a liquid crystal display, a thin-film transistor liquid crystal display, an organic light-emitting diode, a flexible display, a three-dimensional (3D) display, and an electrophoretic display.

The acoustic output interface may output audio data received from the communication interface 3250 or stored in the memory. The vibration motor may output a vibration signal.

The processor 3290 may commonly control a general operation of the device 3000. For example, the processor 3290 may generally control the user input interface, the output interface, the sensor, the communication interface 3250, an A/V input interface, and the like by executing programs stored in the memory. The processor 3290 may control operations of the device 3000 to perform the functions of the device 3000, which are disclosed with reference to FIGS. 1 to 10B.

In detail, the processor 3290 may perform autonomous driving of the device 3000 based on a precise digital map. For example, the processor 3290 may perform autonomous driving of the device 3000 based on a partial precise digital map of a partial section of a traveling path.

The sensor may detect a state of the device 3000 or a state of the surroundings of the device 3000 and transfer the detected information to the processor 3290.

The sensor may include at least one of a magnetic sensor, an acceleration sensor, a temperature/humidity sensor, an IR sensor, a gyroscope sensor, a position sensor (e.g., GPS), an atmospheric pressure sensor, a proximity sensor, and an RGB (illuminance) sensor but is not limited thereto. A function of each sensor may be intuitively inferred by those of ordinary skill in the art from a name thereof, and thus a detailed description thereof is omitted herein.

The communication interface 3250 may include at least one component for communicating between the device 3000 and the outside. For example, the communication interface 3250 may include a short-range wireless communication interface, a mobile communication interface, and a broadcast reception interface.

In addition, the communication interface 3250 may be configured to communicate with the outside. The communication interface 3250 may include a transmitter configured to transmit data to an external device and a receiver configured to receive data from an external device.

The short-range wireless communication interface may include a Bluetooth communication interface, a Bluetooth low energy (BLE) communication interface, a near-field communication interface, a WLAN (Wi-Fi) communication interface, a Zigbee communication interface, an infrared data association (IrDA) communication interface, a Wi-Fi Direct (WFD) communication interface, an ultra-wideband (UWB) communication interface, an Ant+ communication interface, and the like but is not limited thereto.

The mobile communication interface transmits and receives a wireless signal to and from at least one of a base station, an external terminal, and a server in a mobile communication network. Herein the wireless signal may include a voice call signal, a video call signal, various types of data according to text/multimedia message transmission and reception, multimedia data, or precise digital map data.

The processor 3290 may request for a precise digital map of a traveling path of a vehicle from the central server 1000 through the mobile communication interface.

In addition, the processor 3290 may receive, from the central server 1000 through the mobile communication interface, access information of an edge server 2000 from which a partial precise digital map of a partial section of the traveling path is to be received.

In addition, the processor 3290 may receive the partial precise digital map of the partial section of the traveling path from the edge server 2000 through the mobile communication interface based on the access information of an edge server 2000.

The broadcast reception interface receives a broadcast signal and/or broadcast related information from the outside through a broadcast channel, and the broadcast channel may include a satellite channel and a terrestrial channel. According to implementation examples, the device 3000 may not include the broadcast reception interface.

The A/V input interface is to input an audio signal or a video signal and may include a camera, a microphone, and the like.

The memory may store programs for processing and control of the processor 3290 and store data input to the device 3000 or output from the device 3000.

The memory may store a precise digital map.

The memory may include at least one type of storage medium from among a flash memory type memory, a hard disk type memory, a multimedia card micro type memory, a card type memory (e.g., an SD or XD memory), RAM, SRAM, ROM, EEPROM, PROM, a magnetic memory, a magnetic disc, and an optical disc.

The programs stored in the memory may be classified into a plurality of modules according to functions thereof, e.g., a user interface (UI) module, a touch screen module, an alarm module, an image filter module, and the like.

The UI module may provide a specified UI, a specified graphic UI (GUI), or the like interoperating with the device 3000 for each application. The touch screen module may sense a touch gesture of the user on a touch screen and transmit information regarding the touch gesture to the processor 3290. According to an embodiment, the touch screen module may recognize and analyze a touch code. The touch screen module may be configured by separate hardware including a processor.

Figure 15:
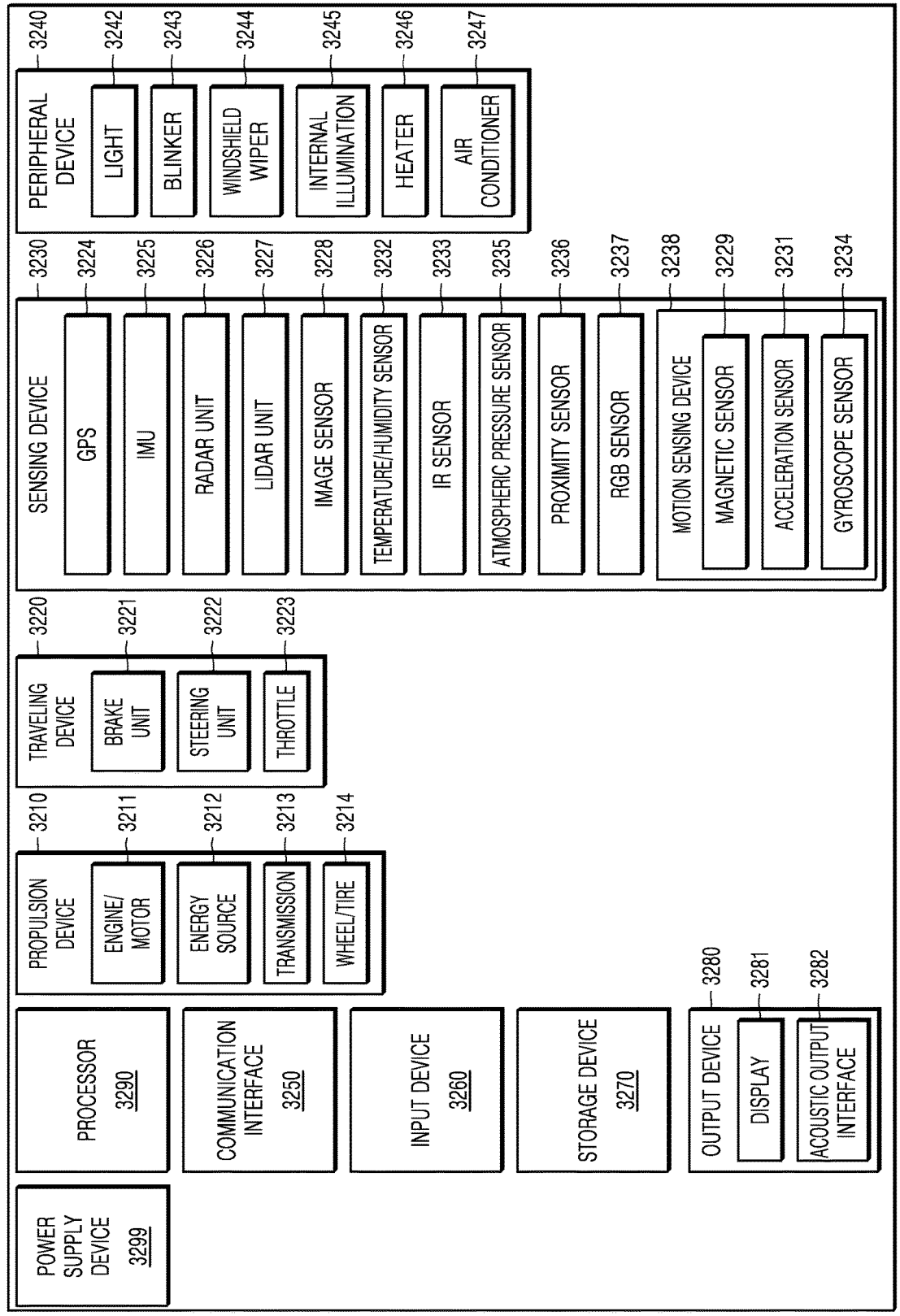
FIG. 15 is a block diagram of the device according to an embodiment.

FIG. 15 is a block diagram of the device 3000 according to an embodiment.

The device 3000 may be an autonomous vehicle.

The autonomous vehicle 3000 may include a propulsion device 3210, a power supply device 3299, a communication interface 3250, an input device 3260, an output device 3280, a storage device 3270, a traveling device 3220, a sensing device 3230, a peripheral device 3240, and a processor 3290. However, it will be understood by those of ordinary skill in the art to which the present embodiment belongs that the autonomous vehicle 3000 may further include other general-use components besides the components shown in FIG. 15 or some of the components shown in FIG. 15 may not be included in the autonomous vehicle 3000.

The propulsion device 3210 may include an engine/motor 3211, an energy source 3212, a transmission 3213, and a wheel/tire 3214.

The engine/motor 3211 may be an arbitrary combination of an internal-combustion engine, an electrical motor, a steam engine, and a stirling engine. For example, when the autonomous vehicle 3000 is a gas-electric hybrid car, the engine/motor 3211 may include a gasoline engine and an electrical motor.

The energy source 3212 may be an energy supply source for entirely or partially supplying power to the engine/motor 3211. The engine/motor 3211 may be configured to convert the energy source 3212 into mechanical energy. The energy source 3212 may be at least one of, for example, gasoline, diesel, propane, other compressed gas-based fuels, ethanol, a solar panel, a battery, and other electrical power sources. Alternatively, the energy source 3212 may be at least one of a fuel tank, a battery, a capacitor, and a flywheel. The energy source 3212 may provide energy to systems and devices of the autonomous vehicle 3000.

The transmission 3213 may be configured to transfer mechanical power from the engine/motor 3211 to the wheel/tire 3214. For example, the transmission 3213 may include at least one of a gearbox, a clutch, a differential, and a driving shaft. When the transmission 3213 includes driving shafts, the driving shafts may include one or more axles configured such that the transmission 3213 is coupled to the wheel/tire 3214.

The wheel/tire 3214 may be configured in various forms including a unicycle form, a bicycle/motorcycle form, a tricycle form, and a four-wheel form of cars/trucks. For example, other wheel/tire forms including six or more wheels may be possible. The wheel/tire 3214 may include at least one wheel fixedly attached to the transmission 3213 and at least one tire coupled to a rim of the at least one wheel which may come in contact with a driving surface.

The traveling device 3220 may include a brake unit 3221, a steering unit 3222, and a throttle 3223.

The steering unit 3222 may be a combination of mechanisms configured to steer a direction of the autonomous vehicle 3000.

The throttle 3223 may be a combination of mechanisms configured to control a speed of the autonomous vehicle 3000 by controlling an operating speed of the engine/motor 3211. In addition, the throttle 3223 may adjust a mixed gas amount of a fuel and air flowing into the engine/motor 3211 by adjusting a throttle open amount and control power and thrust by adjusting a throttle open amount.

The brake unit 3221 may be combination of mechanisms configured to decelerate the autonomous vehicle 3000. For example, the brake unit 3221 may use friction to reduce a speed of the wheel/tire 3214.

The sensing device 3230 may include a plurality of sensors configured to sense information on an environment at which the autonomous vehicle 3000 is located and may also include one or more actuators configured to correct positions and/or orientations of the sensors. For example, the sensing device 3230 may include a GPS 3224, an inertial measurement unit (IMU) 3225, a RADAR unit 3226, a light detection and ranging (LIDAR) unit 3227, and an image sensor 3228. In addition, the sensing device 3230 may include at least one of a temperature/humidity sensor 3232, an IR sensor 3233, an atmospheric pressure sensor 3235, a proximity sensor 3236, and an RGB (illuminance) sensor 3237 but is not limited thereto. A function of each sensor may be intuitively inferred by those of ordinary skill in the art from a name thereof, and thus a detailed description thereof is omitted herein.

In addition, the sensing device 3230 may include a motion sensing device 3238 capable of sensing a motion of the autonomous vehicle 3000. The motion sensing device 3238 may include a magnetic sensor 3229, an acceleration sensor 3231, and a gyroscope sensor 3234.

The GPS 3224 may be configured to estimate a geographical position of the autonomous vehicle 3000. That is, the GPS 3224 may include a transceiver configured to estimate a position of the autonomous vehicle 3000 on the Earth.

The IMU 3225 may be a combination of sensors configured to sense changes in a position and an orientation of the autonomous vehicle 3000 based on an inertial acceleration. For example, the combination of sensors may include accelerometers and gyroscopes.

The RADAR unit 3226 may be configured to sense objects in an environment at which the autonomous vehicle 3000 is located, by using a wireless signal. In addition, the RADAR unit 3226 may be configured to sense speeds and/or directions of the objects.

The LIDAR unit 3227 may be configured to sense objects in an environment at which the autonomous vehicle 3000 is located, by using a laser beam. In more detail, the LIDAR unit 3227 may include a laser light source and/or a laser scanner configured to emit a laser beam and a detector configured to detect a reflected laser beam. The LIDAR unit 3227 may be configured to operate in a coherent detection mode (e.g., using heterodyne detection) or an incoherent detection mode.

The image sensor 3228 may include a still camera or a video camera configured to record 3D images of the inside of the autonomous vehicle 3000. For example, the image sensor 3228 may include a plurality of cameras, and the plurality of cameras may be arranged at a plurality of positions inside and outside the autonomous vehicle 3000.

The peripheral device 3240 may include a light 3242, a blinker 3243, a windshield wiper 3244, an internal illumination 3245, a heater 3246, and an air conditioner 3247.

The storage device 3270 may include a magnetic disc drive, an optical disc drive, and a flash memory. Alternatively, the storage device 3270 may be a portable universal serial bus (USB) data storage device. The storage device 3270 may store system software configured to execute examples related to the present application. The system software configured to execute examples related to the present application may be stored in a portable storage medium.

The communication interface 3250 may include at least one antenna to wirelessly communicate with another device. For example, the communication interface 3250 may be used to communicate with a cellular network or other wireless protocols and systems in a wireless manner through WiFi or Bluetooth. The communication interface 3250 controlled by the processor 3290 may transmit and receive a wireless signal. For example, the processor 3290 may execute a program stored in the storage device 3270 to transmit and receive a wireless signal to and from a cellular network.

The input device 3260 indicates a means configured to input data for controlling the autonomous vehicle 3000. For example, the input device 3260 may include a key pad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto. In addition, the input device 3260 may include a microphone, and the microphone may be configured to receive audio (e.g., a voice command) from a passenger.

The output device 3280 may output an audio signal or a video signal, and may include a display 3281 and an acoustic output interface 3282.

The display 3281 may include at least one of a liquid crystal display, a thin-film transistor liquid crystal display, an organic light-emitting diode, a flexible display, a 3D display, and an electrophoretic display. In addition, the output device 3280 may include two or more displays 3281 according to an implementation form of the output device 3280.

The acoustic output interface 3282 may output audio data received from the communication interface 3250 or stored in the storage device 3270. In addition, the acoustic output interface 3282 may include a speaker, a buzzer, and the like.

Each of the input device 3260 and the output device 3280 may include a network interface, and the input device 3260 and the output device 3280 may be implemented by a touch screen.

The processor 3290 commonly controls a general operation of the autonomous vehicle 3000. For example, the processor 3290 may generally control the propulsion device 3210, the traveling device 3220, the sensing device 3230, the peripheral device 3240, the communication interface 3250, the input device 3260, the storage device 3270, the output device 3280, and the power supply device 3299 by executing the programs stored in the storage device 3270. In addition, the processor 3290 may control a motion of the autonomous vehicle 3000.

In addition, the processor 3290 may control autonomous driving of the autonomous vehicle 3000 based on sensed data and a precise digital map.

The power supply device 3299 may be configured to supply power to some or all of the components of the autonomous vehicle 3000. For example, the power supply device 3299 may include a rechargeable lithium-ion or lead-acid battery.

An embodiment may be implemented in a form of a recording medium including computer-executable instructions such as a program module executed by a computer system. A non-transitory computer-readable medium may be an arbitrary available medium which may be accessed by a computer system and includes all types of volatile and nonvolatile media and separated and non-separated media. In addition, the non-transitory computer-readable medium may include all types of computer storage media and communication media. The computer storage media include all types of volatile and nonvolatile and separated and non-separated media implemented by an arbitrary method or technique for storing information such as computer-readable instructions, a data structure, a program module, or other data. The communication media typically include computer-readable instructions, a data structure, a program module, other data of a modulated signal such as a carrier, other transmission mechanism, and arbitrary information delivery media.

In addition, in the present specification, "unit" may indicate a hardware component such as a processor or a circuit and/or a software component executed by a hardware component such as a processor.

The embodiments described above are only illustrative, and it will be understood by those of ordinary skill in the art that various changes in form and details may be made therein without changing the technical spirit and mandatory features of the inventive concept. Therefore, the embodiments should be understood in the illustrative sense only and not for the purpose of limitation in all aspects. For example, each component described as a single type may be carried out by being distributed, and likewise, components described as a distributed type may also be carried out by being coupled.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A server for providing a vehicle a precise digital map of a traveling path of the vehicle, the server comprising:
    a processor configured to divide the traveling path into a plurality of sections of the traveling path, determine a plurality of edge servers respectively corresponding to each section among the plurality of sections of the traveling path, each edge server among the plurality of edge servers respectively providing a partial precise digital map that is a portion of the precise digital map corresponding to a section among the plurality of sections to the vehicle, and determine a time point at which the partial precise digital map of each section among the plurality of sections of the traveling path is transmitted to the vehicle by using an expected traveling time from a current position of the vehicle to a starting position of each section; and a transceiver configured to receive, from the vehicle, a request for the precise digital map of the traveling path of the vehicle and to transmit, based on the determined time point, a request to the plurality of edge servers respectively corresponding to the plurality of sections of the traveling path to respectively transfer the partial precise digital map corresponding to the section of the traveling path when the vehicle respectively approaches each section of the traveling path among the plurality of sections of the traveling path.

2. The server of claim 1, wherein the processor is further configured to determine the plurality of edge servers based on respective positions of the plurality of edge servers with respect to the traveling path of the vehicle.

3. The server of claim 1, wherein the plurality of edge servers store precise digital maps of geographic regions corresponding to geographic positions of the plurality of edge servers, respectively, and the processor is further configured to determine the plurality of edge servers to which the precise digital map is to be transmitted based on the geographic regions respectively corresponding to the geographic positions of the plurality of edge servers.

4. The server of claim 3, wherein at least one of the plurality of edge servers is a base station configured to relay mobile communication, and the geographic regions respectively corresponding to the geographic positions of the plurality of edge servers comprise at least one of a coverage area of the base station and coverage areas of other base stations adjacent to the base station.

5. The server of claim 1, wherein the processor is further configured to determine that the vehicle respectively approaches each section of the plurality of sections of the traveling path when the vehicle is within a determined distance from the starting position of each section of the plurality of sections of the traveling path.

6. The server of claim 1, wherein the request to the plurality of edge servers comprises identification information of the vehicle.

7. The server of claim 1, wherein the transceiver is further configured to transmit, to the vehicle, a request to receive the partial precise digital map corresponding to the plurality of sections of the traveling path from the plurality of edge servers corresponding to each section among the plurality of sections, by transmitting access information of the plurality of edge servers to the vehicle.

8. The server of claim 1, wherein the precise digital map is formed of a plurality of layers respectively comprising pieces of information on different objects, and wherein the request to the plurality of edge servers comprises identification of a layer among the plurality of layers.

9. The server of claim 8, further comprising a memory configured to store a time that the precise digital map is updated, wherein the transceiver is further configured to receive, from the vehicle, a creation time of the precise digital map stored in the vehicle, and transmit layers of which the creation time of the precise digital map stored in the vehicle is earlier than the time that the precise digital map is updated.

10. A method of providing a vehicle a precise digital map of a traveling path of the vehicle, the method comprising:

receiving, from the vehicle, a request for the precise digital map of the traveling path of the vehicle;

dividing the traveling path into a plurality of sections of the traveling path;

determining a plurality of edge servers respectively corresponding to each section among the plurality of sections of the traveling path, each edge server among the plurality of edge servers respectively providing a partial precise digital map that is a portion of the precise digital map corresponding to a section among the plurality of sections to the vehicle;

determining a time point at which the partial precise digital map of each section among the plurality of sections of the traveling path is transmitted to the vehicle by using an expected traveling time from a current position of the vehicle to a starting position of each section; and requesting the plurality of edge servers respectively corresponding to the plurality of sections of the traveling path to respectively transfer the partial precise digital map corresponding to the section of the traveling path based on the determined time point when the vehicle respectively approaches each section of the traveling path among the plurality of sections of the traveling path.

11. The method of claim 10, wherein the determining of the plurality of edge servers comprises determining the plurality of edge servers based on respectively positions of the plurality of edge servers with respect to the traveling path of the vehicle.

12. The method of claim 10, wherein the plurality of edge servers store precise digital maps of geographic regions corresponding to geographic positions of the plurality of edge servers, respectively, and the determining comprises determining the plurality of edge servers to which the precise digital map is to be transmitted based on the geographic regions respectively corresponding to the geographic positions of the plurality of edge servers.

13. The method of claim 12, wherein at least one of the plurality of edge servers is a base station configured to relay mobile communication, and the geographic regions respectively corresponding to the geographic positions of the plurality of edge servers comprise at least one of a coverage area of the base station and coverage areas of other base stations adjacent to the base station.

14. The method of claim 10, further comprising determining that the vehicle respectively approaches each section of the plurality of sections of the traveling path when the vehicle is within a determined distance from the starting position of each section of the plurality of sections of the traveling path.

15. The method of claim 10, wherein the requesting comprises transmitting a request comprising identification information of the vehicle.

16. The method of claim 10, further comprising requesting the vehicle to receive the partial precise digital map corresponding to the plurality of sections of the traveling path from the plurality of edge servers corresponding to each section among the plurality of sections, by transmitting access information of the plurality of edge servers to the vehicle.

17. The method of claim 10, wherein the precise digital map is formed of a plurality of layers respectively comprising pieces of information on different objects, and
the requesting comprises transmitting a request to the plurality of edge servers comprising identification of a layer among the plurality of layers.

18. The server of claim 1, wherein the precise digital map comprises a map from which a geographical feature or a planimetric feature is identified to three-dimensionally express a fluctuation of terrain, a radius and a curvature of a curved road, and a surrounding environment.

19. The method of claim 10, wherein the precise digital map comprises a map from which a geographical feature or a planimetric feature is identified to three-dimensionally express a fluctuation of terrain, a radius and a curvature of a curved road, and a surrounding environment.

20. A non-transitory computer-readable recording medium having recorded thereon a program for performing a method on a computer, the method comprising:
receiving, from a vehicle, a request for a precise digital map of a traveling path of the vehicle;
dividing the traveling path into a plurality of sections of the traveling path;
determining a plurality of edge servers respectively corresponding to each section among the plurality of sections of the traveling path, each edge server among the plurality of edge servers respectively providing a partial precise digital map that is a portion of the precise digital map corresponding to a section among the plurality of sections to the vehicle;
determining a time point at which the partial precise digital map of each section among the plurality of sections of the traveling path is transmitted to the vehicle by using an expected traveling time from a current position of the vehicle to a starting position of each section; and
requesting the plurality of edge servers respectively corresponding to the plurality of sections of the traveling path to respectively transfer the partial precise digital map corresponding to the section of the traveling path based on the determined time point when the vehicle respectively approaches each section of the traveling path among the plurality of sections of the traveling path.

* * * * *